US012726610B2

(12) United States Patent
Deshpande

(10) Patent No.: US 12,726,610 B2
(45) Date of Patent: Sep. 1, 2026

(54) SYSTEMS AND METHODS FOR SIGNALING REFERENCE PICTURE LIST ENTRY INFORMATION IN VIDEO CODING

(71) Applicant: SHARP KABUSHIKI KAISHA, Sakai City (JP)

(72) Inventor: Sachin G. Deshpande, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/870,514

(22) PCT Filed: May 24, 2023

(86) PCT No.: PCT/JP2023/019261
§ 371 (c)(1),
(2) Date: Nov. 29, 2024

(87) PCT Pub. No.: WO2023/234133
PCT Pub. Date: Dec. 7, 2023

(65) Prior Publication Data

US 2025/0330567 A1 Oct. 23, 2025

Related U.S. Application Data

(60) Provisional application No. 63/347,393, filed on May 31, 2022.

(51) Int. Cl.

| | |
|---|---|
| ***H04N 19/105*** | (2014.01) |
| ***H04N 19/172*** | (2014.01) |
| ***H04N 19/70*** | (2014.01) |

(52) U.S. Cl.
CPC ......... *H04N 19/105* (2014.11); *H04N 19/172* (2014.11); *H04N 19/70* (2014.11)

(58) Field of Classification Search
CPC .... H04N 19/105; H04N 19/172; H04N 19/70; H04N 19/174; H04N 19/30; H04N 19/573; H04N 19/58
(Continued)

(56) References Cited

U.S. PATENT DOCUMENTS

| | | | | |
|---|---|---|---|---|
| 2016/0100189 A1* | 4/2016 | Pang | ...................... | H04N 19/44 375/240.13 |
| 2023/0032818 A1* | 2/2023 | Choi | ...................... | H04N 19/44 |

(Continued)

FOREIGN PATENT DOCUMENTS

| | | | | |
|---|---|---|---|---|
| CA | 2849499 * | 3/2013 | ............. | H04N 19/58 |
| WO | 2020070005 A1 | 4/2020 | | |

OTHER PUBLICATIONS

ITU-T H.264 (V15) (Aug. 2024), "Series H: Audiovisual and multimedia systems Infrastructure of audiovisual services—Coding of moving video", "Advanced video coding for generic audiovisual services".

(Continued)

*Primary Examiner* — Marnie A Matt
(74) *Attorney, Agent, or Firm* — ScienBiziP, P.C.

(57) ABSTRACT

This disclosure relates to video coding and more particularly to techniques for signaling reference picture list entry information for coded video. In one example, a method of signaling reference picture list entry information (ref_pic_list_struct( )) for video data comprises signaling a syntax element (abs_delta_poc_st) specifying a value for a variable specifying an absolute delta picture order count for a short term reference picture, wherein the signaled value plus one specifies the value for variable in a case that a corresponding short term reference picture is a first occurring short term reference picture in a reference picture list.

3 Claims, 6 Drawing Sheets

(58) Field of Classification Search
USPC ..................................................... 375/240.12
See application file for complete search history.

(56) References Cited

U.S. PATENT DOCUMENTS

| | | | | |
|---|---|---|---|---|
| 2023/0077443 A1* | 3/2023 | Wang | H04N 19/423 | 375/240.26 |
| 2023/0111484 A1* | 4/2023 | Wang | H04N 19/174 | 375/240.26 |
| 2023/0370627 A1* | 11/2023 | Sjöberg | H04N 19/44 | |

OTHER PUBLICATIONS

ITU-T H.265(Dec. 2016), "Series H: Audiovisual and Multimedia Systems Infrastructure of audiovisual services—Coding of moving video", "High efficiency video coding".

Jianle Chen, et al., "Algorithm Description of Joint Exploration Test Model 7 (JEM 7)", Document: JVET-G1001-v1, Joint Video Exploration Team (JVET) of ITU-T SG 16 WP 3 and ISO/IEC JTC 1/SC 29/WG 11 7th Meeting: Torino, IT, Jul. 13-21, 2017.

Benjamin Bross, "Versatile Video Coding (Draft 1)", Document: JVET-J1001-v2, Joint Video Experts Team (JVET) of ITU-T SG 16 WP 3 and ISO/IEC JTC 1/SC 29/WG 11, 10th Meeting: San Diego, US, Apr. 10-20, 2018.

Benjamin Bross et al., "Versatile Video Coding Editorial Refinements on Draft 10", Document: JVET-T2001-v2, Joint Video Experts Team (JVET) of ITU-T SG 16 WP 3 and ISO/IEC JTC 1/SC 29, 20th Meeting, by teleconference, Oct. 7-16, 2020.

Sachin Deshpande, "On Reference Picture List Information Signalling", Document: JVET-Q0217-v1, Joint Video 1 Experts Team (JVET) of ITU-T SG 16 WP 3 and ISO/IEC JTC 1/SC 29/WG, 11 17th Meeting: Brussels, BE, Jan. 7-17, 2020.

* cited by examiner

FIG. 3

SYSTEMS AND METHODS FOR SIGNALING REFERENCE PICTURE LIST ENTRY INFORMATION IN VIDEO CODING

CROSS REFERENCE

This Nonprovisional application claims priority under 35 U.S.C. § 119 on provisional Application No. 63/347,393 on May 31, 2022, the entire contents of which are hereby incorporated by reference.

TECHNICAL FIELD

This disclosure relates to video coding and more particularly to techniques for signaling reference picture list entry information for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate re-constructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the $10^{th}$ Meeting of ISO/IEC JTC1/SC29/WG11 16-20 Apr. 2018, San Diego, CA. From the multiple descriptions of video coding tools, a resulting initial draft text of a video coding specification is described in "Versatile Video Coding (Draft 1)," $10^{th}$ Meeting of ISO/IEC JTC1/SC29/WG11 16-20 Apr. 2018, San Diego, CA, document JVET-J1001-v2, which is incorporated by reference herein, and referred to as JVET-J1001. This development of a next generation video coding standard by the VCEG and MPEG is referred to as the Versatile Video Coding (VVC) project. "Versatile Video Coding (Draft 10)," 20th Meeting of ISO/IEC JTC1/SC29/WG11 7-16 Oct. 2020, Teleconference, document JVET-T2001-v2, which is incorporated by reference herein, and referred to as JVET-T2001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of signaling reference picture list entry information for video data comprises signaling a syntax element specifying a value for a variable specifying an absolute delta picture order count for a short term reference picture, wherein the signaled value plus one specifies the value for variable in a case that a corresponding short term reference picture is a first occurring short term reference picture in a reference picture list.

In one example, a method of decoding video data comprises receiving a syntax element specifying a value for a variable specifying an absolute delta picture order count for a short term reference picture, determining whether the syntax element corresponds to a short term reference picture that is a first occurring short term reference picture in a reference picture list, and determining the value for variable as the signaled value plus one in a case that the short term reference picture is the first occurring short term reference picture in the reference picture list.

In one example, a device comprises one or more processors configured to receive a syntax element specifying a value for a variable specifying an absolute delta picture order count for a short term reference picture, determine whether the syntax element corresponds to a short term reference picture that is a first occurring short term reference picture in a reference picture list, and determine the value for variable as the signaled value plus one in a case that the short term reference picture is the first occurring short term reference picture in the reference picture list.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a conceptual diagram illustrating a data structure encapsulating coded video data and corresponding metadata according to one or more techniques of this disclosure.

DESCRIPTION OF EMBODIMENTS

Figure 1:
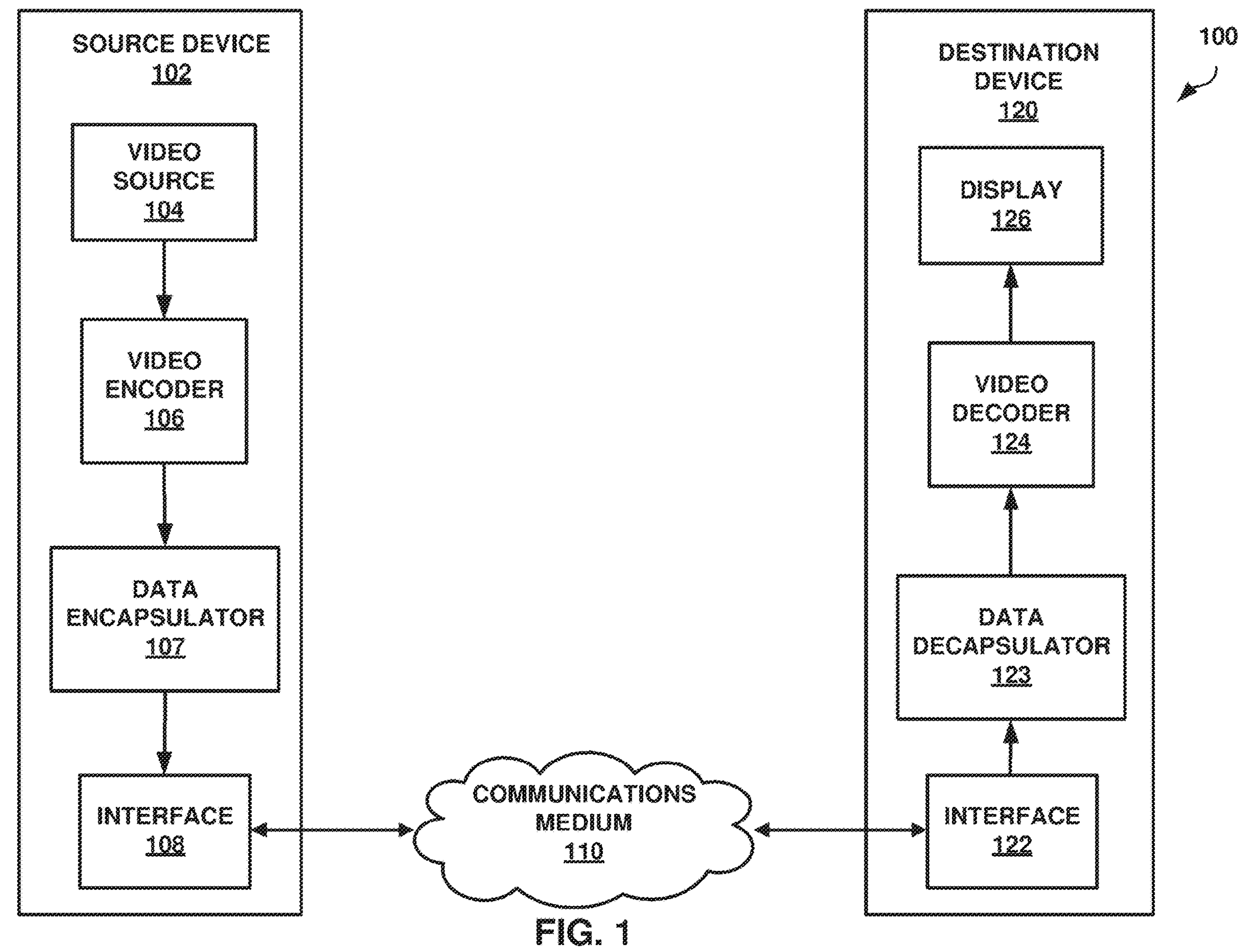
FIG. 1 is a block diagram illustrating an example of a system that may be configured to encode and decode video data according to one or more techniques of this disclosure.

In general, this disclosure describes various techniques for coding video data. In particular, this disclosure describes techniques for signaling reference picture list entry information for coded video data. It should be noted that although techniques of this disclosure are described with respect to ITU-T H.264, ITU-T H.265, JEM, and JVET-T2001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-T2001. Thus, reference to ITU-T H.264, ITU-T H.265, JEM, and/or JVET-T2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8x8 luma samples. In ITU-T H.265, the decision to code a picture area using intra prediction or inter prediction is made at the CU level.

In ITU-T H.265, a CU is associated with a prediction unit structure having its root at the CU. In ITU-T H.265, prediction unit structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may be halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-T2001, CTUs are partitioned according a quadtree plus multi-type tree (QTMT or QT+MTT) structure. The QTMT in JVET-T2001 is similar to the QTBT in JEM. However, in JVET-T2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-T2001, slices are required to consist of an integer number of complete tiles or an integer number of consecutive complete CTU rows within a tile, instead of only being required to consist of an integer number of CTUs. It should be noted that in JVET-T2001, the slice design does not include slice segments (i.e., no independent/dependent slice segments). Thus, in JVET-T2001, a picture may include a single tile, where the single tile is contained within a single slice or a picture may include multiple tiles where the multiple tiles (or CTU rows thereof) may be contained within one or more slices. In JVET-T2001, the partitioning of a picture into tiles is specified by specifying respective heights for tile rows and respective widths for tile columns. Thus, in JVET-T2001 a tile is a rectangular region of CTUs within a particular tile row and a particular tile column position. Further, it should be noted that JVET-T2001 provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, as described in further detail below, a bitstream of coded video data includes a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 2:
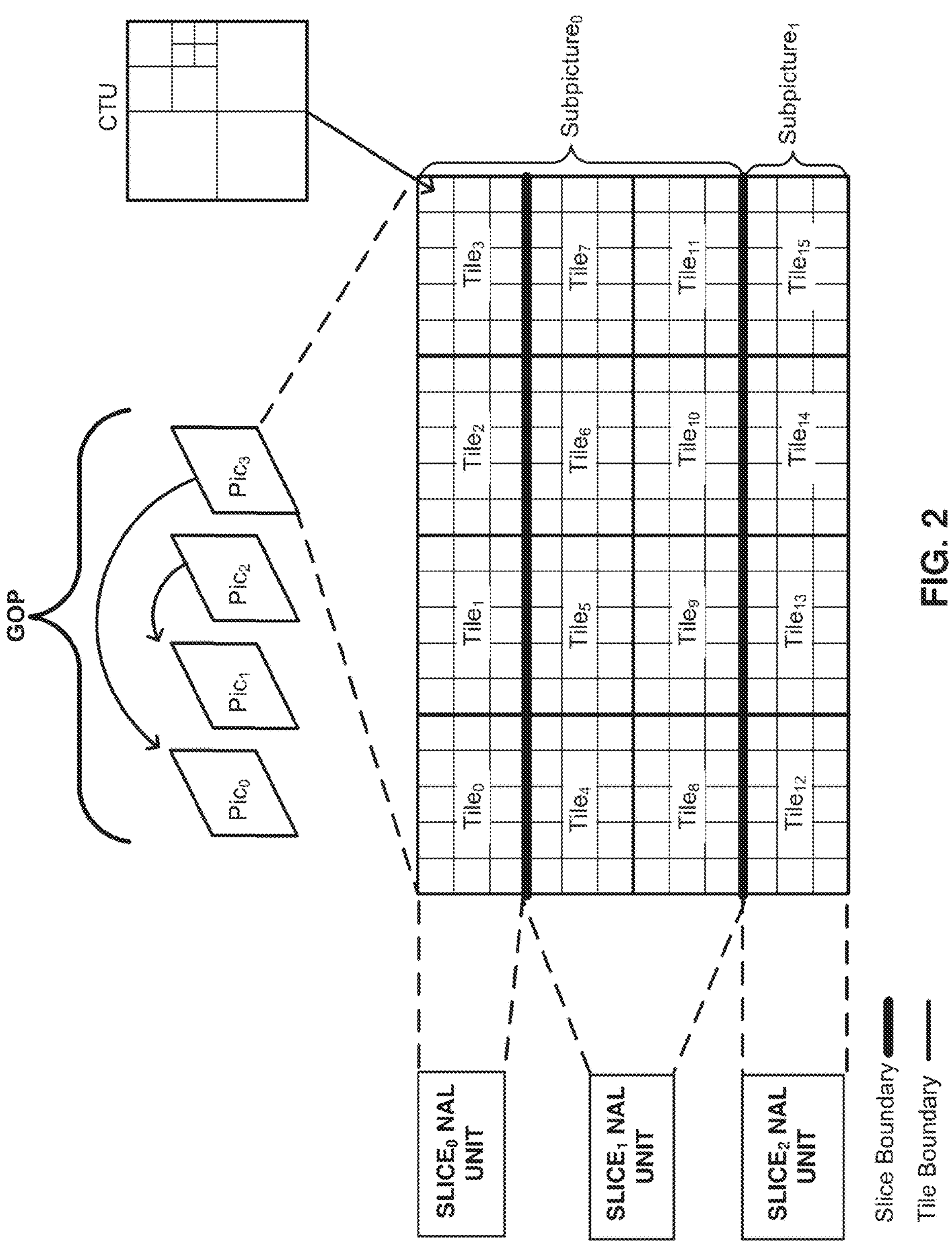
FIG. 2 is a conceptual diagram illustrating coded video data and corresponding data structures according to one or more techniques of this disclosure.

FIG. 2 is a conceptual diagram illustrating an example of a picture within a group of pictures partitioned according to tiles, slices, and subpictures. It should be noted that the techniques described herein may be applicable to tiles, slices, subpictures, sub-divisions thereof and/or equivalent structures thereto. That is, the techniques described herein may be generally applicable regardless of how a picture is partitioned into regions. For example, in some cases, the techniques described herein may be applicable in cases where a tile may be partitioned into so-called bricks, where a brick is a rectangular region of CTU rows within a particular tile. Further, for example, in some cases, the techniques described herein may be applicable in cases where one or more tiles may be included in so-called tile groups, where a tile group includes an integer number of adjacent tiles. In the example illustrated in FIG. 2, $Pic_3$ is illustrated as including 16 tiles (i.e., $Tile_0$ to $Tile_{15}$) and three slices (i.e., $Slice_0$ to $Slice_2$). In the example illustrated in FIG. 2, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 2, $Pic_3$ is illustrated as including two subpictures (i.e., $Subpicture_1$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and $Subpicture_1$ may corresponding to a scrolling banner displayed during the sporting event presentation. By using organizing a picture into subpictures in this manner, a viewer may be able to disable the display of the scrolling banner. That is, through a sub-bitstream extraction process $Slice_2$ NAL unit may be removed from a bitstream (and thus not decoded and/or displayed) and $Slice_0$ NAL unit and $Slice_1$ NAL unit may be decoded and displayed. The encapsulation of slices of a picture into respective NAL unit data structures and sub-bitstream extraction are described in further detail below.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called “merge” mode, and “skip” and “direct” motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_2$ is illustrated as referencing $Pic_1$. Similarly, $Pic_3$ is illustrated as referencing $Pic_0$. With respect to FIG. 2, assuming the picture number corresponds to the decoding order, the DPB would be populated as follows: after decoding $Pic_0$, the DPB would include $\{Pic_0\}$; at the onset of decoding $Pic_1$, the DPB would include $\{Pic_0\}$; after decoding $Pic_1$, the DPB would include $\{Pic_0, Pic_1\}$; at the onset of decoding $Pic_2$, the DPB would include $\{Pic_0, Pic_1\}$. $Pic_2$ would then be decoded with reference to $Pic_1$ and after decoding $Pic_2$, the DPB would include $\{Pic_0, Pic_1, Pic_2\}$. At the onset of decoding $Pic_3$, pictures $Pic_0$ and $Pic_1$ would be marked for removal from the DPB, as they are not needed for decoding $Pic_3$ (or any subsequent pictures, not shown) and assuming $Pic_1$ and $Pic_2$ have been output, the DPB would be updated to include $\{Pic_0\}$. $Pic_3$ would then be decoded by referencing $Pic_0$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-T2001, a CU is associated with a transform tree structure having its root at the CU level. The transform tree is partitioned into one or more transform units (TUs). That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax clement and previously coded syntax elements. For example, values of syntax elements associated with neighboring video blocks may be used to determine a context for a current bin.

With respect to the equations used herein, the following arithmetic operators may be used:

+ Addition

– Subtraction

* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.

Further, the following mathematical functions may be used:

Log 2(x) the base-2 logarithm of x;

$$\text{Min}(x, y) = \begin{cases} x & ; \; x <= y \\ y & ; \; x > y \end{cases};$$

$$\text{Max}(x, y) = \begin{cases} x & ; \; x >= y \\ y & ; \; x < y \end{cases}$$

Ceil(x) the smallest integer greater than or equal to x.

With respect to the example syntax used herein, the following definitions of logical operators may be applied:

x && y Boolean logical "and" of x and y x||y Boolean logical "or" of x and y

! Boolean logical "not"

x?y:z If x is TRUE or not equal to 0, evaluates to the value of y; otherwise, evaluates to the value of 2.

Further, the following relational operators may be applied:

> Greater than

>= Greater than or equal to

< Less than

<= Less than or equal to

== Equal to

!= Not equal to

Further, it should be noted that in the syntax descriptors used herein, the following descriptors may be applied:

b(8): byte having any pattern of bit string (8 bits). The parsing process for this descriptor is specified by the return value of the function read_bits (8).

f(n): fixed-pattern bit string using n bits written (from left to right) with the left bit first. The parsing process for this descriptor is specified by the return value of the function read_bits (n).

se(v): signed integer 0-th order Exp-Golomb-coded syntax element with the left bit first.

tb(v): truncated binary using up to maxVal bits with maxVal defined in the semantics of the symtax element.

tu(v): truncated unary using up to maxVal bits with maxVal defined in the semantics of the symtax element.

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer 0-th order Exp-Golomb-coded syntax element with the left bit first.

As described above, video content includes video sequences comprised of a series of pictures and each picture may be divided into one or more regions. In JVET-T2001, a coded representation of a picture comprises VCL NAL units of a particular layer within an AU and contains all CTUs of the picture. For example, referring again to FIG. 2, the coded representation of $Pic_3$ is encapsulated in three coded slice NAL units (i.e., $Slice_0$ NAL unit, $Slice_1$ NAL unit, and $Slice_2$ NAL unit). It should be noted that the term video coding layer (VCL) NAL unit is used as a collective term for coded slice NAL units, i.e., VCL NAL is a collective term which includes all types of slice NAL units. As described above, and in further detail below, a NAL unit may encapsulate metadata used for decoding video data. A NAL unit encapsulating metadata used for decoding a video sequence is generally referred to as a non-VCL NAL unit. Thus, in JVET-T2001, a NAL unit may be a VCL NAL unit or a non-VCL NAL unit. It should be noted that a VCL NAL unit includes slice header data, which provides information used for decoding the particular slice. Thus, in JVET-T2001, information used for decoding video data, which may be referred to as metadata in some cases, is not limited to being included in non-VCL NAL units. JVET-T2001 provides where a picture unit (PU) is a set of NAL units that are associated with each other according to a specified classification rule, are consecutive in decoding order, and contain exactly one coded picture and where an access unit (AU) is a set of PUs that belong to different layers and contain coded pictures associated with the same time for output from the DPB. JVET-T2001 further provides where a layer is a set of VCL NAL units that all have a particular value of a layer identifier and the associated non-VCL NAL units. Further, in JVET-T2001, a PU consists of zero or one PH NAL units, one coded picture, which comprises of one or more VCL NAL units, and zero or more other non-VCL NAL units. Further, in JVET-T2001, a coded video sequence (CVS) is a sequence of AUs that consists, in decoding order, of a CVSS AU, followed by zero or more AUs that are not CVSS AUs, including all subsequent AUs up to but not including any subsequent AU that is a CVSS AU, where a coded video sequence start (CVSS) AU is an AU in which there is a PU for each layer in the CVS and the coded picture in each present picture unit is a coded layer video sequence start (CLVSS) picture. In JVET-T2001, a coded layer video sequence (CLVS) is a sequence of PUs within the same layer that consists, in decoding order, of a CLVSS PU, followed by zero or more PUs that are not CLVSS PUs, including all subsequent PUs up to but not including any subsequent PU that is a CLVSS PU. This is, in JVET-T2001, a bitstream may be described as including a sequence of AUs forming one or more CVSs.

Multi-layer video coding enables a video presentation to be decoded/displayed as a presentation corresponding to a base layer of video data and decoded/displayed one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. Each NAL unit may include an identifier indicating a layer of video data the NAL unit is associated with. As described above, a sub-bitstream extraction process may be used to only decode and display a particular region of interest of a picture. Further, a sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation).

In JVET-T2001, each of a video sequence, a GOP, a picture, a slice, and CTU may be associated with metadata that describes video coding properties and some types of metadata an encapsulated in non-VCL NAL units. JVET-T2001 defines parameters sets that may be used to describe video data and/or video coding properties. In particular, JVET-T2001 includes the following four types of parameter sets: video parameter set (VPS), sequence parameter set (SPS), picture parameter set (PPS), and adaption parameter set (APS), where a SPS applies to apply to zero or more entire CVSs, a PPS applies to zero or more entire coded pictures, a APS applies to zero or more slices, and a VPS may be optionally referenced by a SPS. A PPS applies to an individual coded picture that refers to it. In JVET-T2001, parameter sets may be encapsulated as a non-VCL NAL unit and/or may be signaled as a message. JVET-T2001 also includes a picture header (PH) which is encapsulated as a non-VCL NAL unit. In JVET-T2001, a picture header applies to all slices of a coded picture. JVET-T2001 further enables decoding capability information (DCI) and supplemental enhancement information (SEI) messages to be signaled. In JVET-T2001, DCI and SEI messages assist in processes related to decoding, display or other purposes, however, DCI and SEI messages may not be required for constructing the luma or chroma samples according to a decoding process. In JVET-T2001, DCI and SEI messages may be signaled in a bitstream using non-VCL NAL units. Further, DCI and SEI messages may be conveyed by some mechanism other than by being present in the bitstream (i.e., signaled out-of-band).

Figure 3:
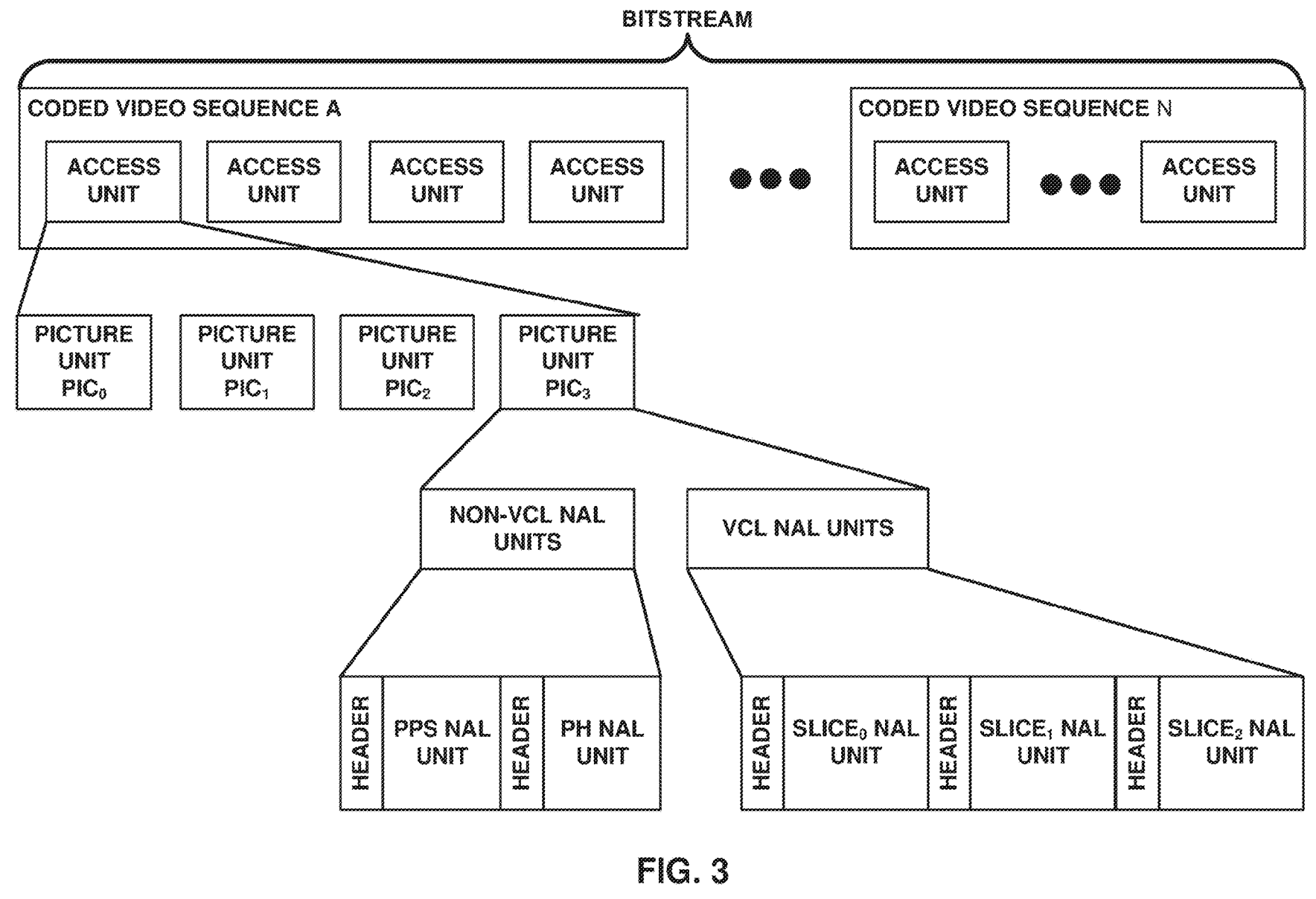

FIG. 3 illustrates an example of a bitstream including multiple CVSs, where a CVS includes AUs, and AUs include picture units. The example illustrated in FIG. 3 corresponds to an example of encapsulating the slice NAL units illustrated in the example of FIG. 2 in a bitstream. In the example illustrated in FIG. 3, the corresponding picture unit for $Pic_3$ includes the three VCL NAL coded slice NAL units, i.e., $Slice_0$ NAL unit, $Slice_1$ NAL unit, and $Slice_2$ NAL unit and two non-VCL NAL units, i.e., a PPS NAL Unit and a PH NAL unit. It should be noted that in FIG. 3, HEADER is a NAL unit header (i.e., not to be confused with a slice header). Further, it should be noted that in FIG. 3, other non-VCL NAL units, which are not illustrated may be included in the CVSs, e.g., SPS NAL units, VPS NAL units, SEI message NAL units, etc. Further, it should be noted that in other examples, a PPS NAL Unit used for decoding $Pic_3$ may be included elsewhere in the bitstream, e.g., in the picture unit corresponding to $Pic_0$ or may be provided by an external mechanism. As described in further detail below, in JVET-T2001, a PH syntax structure may be present in the slice header of a VCL NAL unit or in a PH NAL unit of the current PU.

JVET-T2001 defines NAL unit header semantics that specify the type of Raw Byte Sequence Payload (RBSP) data structure included in the NAL unit. Table 1 illustrates the syntax of the NAL unit header provided in JVET-T2001.

TABLE 1

| | Descriptor |
|---|---|
| nal_unit_header( ) { | |
| forbidden_zero_bit | f(1) |
| nuh_reserved_zero_bit | u(1) |
| nuh_layer_id | u(6) |
| nal_unit_type | u(5) |
| nuh_temporal_id_plus1 | u(3) |
| } | |

JVET-T2001 provides the following definitions for the respective syntax elements illustrated in Table 1.

forbidden_zero_bit shall be equal to 0.

nuh_reserved_zero_bit shall be equal to 0. The value 1 of nuh_reserved_zero_bit could be specified in the future by ITU-T|ISO/IEC. Although the value of nuh_reserved_zero_bit is required to be equal to 0 in this version of this Specification, decoders conforming to this version of this Specification shall allow the value of nuh_reserved_zero_bit equal to 1 to appear in the syntax and shall ignore (i.e. remove from the bitstream and discard) NAL units with nuh_reserved_zero_bit equal to 1.

nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T|ISO/IEC. Although the value of nuh_layer_id is required to be the range of 0 to 55, inclusive, in this version of this Specification, decoders conforming to this version of this Specification shall allow the value of nuh_layer_id to be greater than 55 to appear in the syntax and shall ignore (i.e. remove from the bitstream and discard) NAL units with nuh_layer_id greater than 55.

The value of nuh_layer_id shall be the same for all VCL NAL units of a coded picture. The value of nuh_layer_id of a coded picture or a PU is the value of the nuh_layer_id of the VCL NAL units of the coded picture or the PU.

When nal_unit_type is equal to PH_NUT, or FD_NUT, nuh_layer_id shall be equal to the nuh_layer_id of associated VCL NAL unit.

When nal_unit_type is equal to EOS_NUT, nuh_layer_id shall be equal to one of the nuh_layer_id values of the layers present in the CVS.

NOTE—The value of nuh_layer_id for DCI, OPI, VPS, AUD, and EOB NAL units is not constrained.

nuh_temporal_id_plus1 minus 1 specifies a temporal identifier for the NAL unit.

The value of nuh_temporal_id_plus1 shall not be equal to 0.

The variable TemporalId is derived as follows:

$$TemporalId = \text{nuh\_temporal\_id\_plus1} - 1$$

When nal_unit_type is in the range of IDR_W_RADL to RSV_IRAP_11, inclusive, TemporalId shall be equal to 0.

When nal_unit_type is equal to STSA_NUT and vps_independent_layer_flag[GeneralLayerIdx[nuh_layer_id]] is equal to 1. TemporalId shall be greater than 0.

The value of TemporalId shall be the same for all VCL NAL units of an AU. The value of TemporalId of a coded picture, a PU, or an AU is the value of the TemporalId of the VCL NAL units of the coded picture. PU. or AU. The value of TemporalId of a sublayer representation is the greatest value of TemporalId of all VCL NAL units in the sublayer representation.

The value of TemporalId for non-VCL NAL units is constrained as follows:

If nal_unit_type is equal to DCI_NUT, OPI_NUT, VPS_NUT, or SPS_NUT, TemporalId shall be equal to 0 and the TemporalId of the AU containing the NAL unit shall be equal to 0.

Otherwise, if nal_unit_type is equal to PH_NUT, TemporalId shall be equal to the TemporalId of the PU containing the NAL unit.

Otherwise, if nal_unit_type is equal to EOS_NUT or EOB_NUT, TemporalId shall be equal to 0.

Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.

Otherwise, when nal_unit_type is equal to PPS_NUT, PREFIX_APS_NUT, or SUFFIX_APS_NUT, TemporalId shall be greater than or equal to the TemporalId of the PU containing the NAL unit.

NOTE—When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId could be greater than or equal to the TemporalId of the containing AU, as all PPSs and APSs could be included in the beginning of the bitstream (e.g., when they are transported out-of-band, and the receiver places them at the beginning of the bitstream), wherein the first coded picture has TemporalId equal to 0.

nal_unit_type specifies the NAL unit type, i.e., the type of RBSP data structure contained in the NAL unit as specified in Table 2.

NAL units that have nal_unit_type in the range of UNSPEC28 . . . UNSPEC31, inclusive, for which semantics are not specified, shall not affect the decoding process specified in this Specification.

NOTE—NAL unit types in the range of UNSPEC_28 . . . UNSPEC_31 could be used as determined by the application. No decoding process for these values of nal_unit_type is specified in this Specification. Since different applications might use these NAL unit types for different purposes, particular care is expected to be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the DUs of the bitstream (as specified in Annex C), decoders shall ignore (remove from the bitstream and discard) the contents of all NAL units that use reserved values of nal_unit_type. NOTE—This requirement allows future definition of compatible extensions to this Specification.

TABLE 2

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture* slice_layer_rbsp( ) | VCL |
| 1 | STSA_NUT | Coded slice of an STSA picture or subpicture* slice_layer_rbsp( ) | VCL |
| 2 | RADL_NUT | Coded slice of a RADL picture or subpicture* slice_layer_rbsp( ) | VCL |
| 3 | RASL_NUT | Coded slice of a RASL picture or subpicture* slice_layer_rbsp( ) | VCL |
| 4 . . . 6 | RSV_VCL_4 . . . RSV_VCL_6 | Reserved non-IRAP VCL NAL unit types | VCL |
| 7<br>8 | IDR_W_RADL<br>IDR_N_LP | Coded slice of an IDR picture or subpicture* slice_layer_rbsp( ) | VCL |
| 9 | CRA_NUT | Coded slice of a CRA picture or subpicture* slice_layer_rbsp( ) | VCL |
| 10 | GDR_NUT | Coded slice of a GDR picture or subpicture* slice_layer_rbsp( ) | VCL |
| 11 | RSV_IRAP_11 | Reserved IRAP VCL NAL unit type | VCL |
| 12 | OPI_NUT | Operating point information operating_point_information_rbsp( ) | non-VCL |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17<br>18 | PREFIX_APS_NUT<br>SUFFIX_APS_NUT | Adaptation parameter set adaptation_parameter_set_rbsp( ) | non-VCL |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23<br>24 | PREFIX_SEI_NUT<br>SUFFIX_SEI_NUT | Supplemental enhancement information sei_rbsp( ) | non-VCL |
| 25 | FD_NUT | Filler data filler_data_rbsp( ) | non-VCL |
| 26<br>27 | RSV_NVCL_26<br>RSV_NVCL_27 | Reserved non-VCL NAL unit types | non-VCL |
| 28 . . . 31 | UNSPEC_28 . . . UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

NOTE -

A clean random access (CRA) picture may have associated RASL or RADL pictures present in the bitstream.

NOTE -

An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

The value of nal_unit_type shall be the same for all VCL NAL units of a subpicture. A subpicture is referred to as having the same NAL unit type as the VCL NAL units of the subpicture.

For VCL NAL units of any particular picture, the following applies:

If pps_mixed_nalu_types_in_pic_flag is equal to 0, the value of nal_unit_type shall be the same for all VCL NAL units of a picture, and a picture or a PU is referred to as having the same NAL unit type as the coded slice NAL units of the picture or PU.

Otherwise (pps_mixed_nalu_types_in_pic_flag is equal to 1), all of the following constraints apply:

The picture shall have at least two subpictures.

VCL NAL units of the picture shall have two or more different nal_unit_type values.

There shall be no VCL NAL unit of the picture that has nal_unit_type equal to GDR_NUT.

When a VCL NAL unit of the picture has nal_unit_type equal to nalUnitTypeA that is equal to IDR_W_RADL, IDR_N_LP, or CRA_NUT, other VCL NAL units of the picture shall all have nal_unit_type equal to nalUnitTypeA or TRAIL_NUT.

The value of nal_unit_type shall be the same for all pictures in an IRAP or GDR AU.

When sps_video_parameter_set_id is greater than 0, vps_max_tid_il_ref_pics_plus1[i][j] is equal to 0 for j equal to GeneralLayerIdx[nuh_layer_id] and any value of i in the range of j+1 to vps_max_layers_minus1, inclusive. and pps_mixed_nalu_types_in_pic_flag is equal to 1, the value of nal_unit_type shall not be equal to IDR_W_RADL, IDR_N_LP, or CRA_NUT.

It is a requirement of bitstream conformance that the following constraints apply:

When a picture is a leading picture of an IRAP picture. it shall be a RADL or RASL picture.

When a subpicture is a leading subpicture of an IRAP subpicture. it shall be a RADL or RASL subpicture.

When a picture is not a leading picture of an IRAP picture, it shall not be a RADL or RASL picture.

When a subpicture is not a leading subpicture of an IRAP subpicture, it shall not be a RADL or RASL subpicture.

No RASL pictures shall be present in the bitstream that are associated with an IDR picture.

No RASL subpictures shall be present in the bitstream that are associated with an IDR subpicture.

No RADL pictures shall be present in the bitstream that are associated with an IDR picture having nal_unit_type equal to IDR_N_LP.

NOTE—It is possible to perform random access at the position of an IRAP AU by discarding all PUs before the IRAP AU (and to correctly decode the non-RASL pictures in the IRAP AU and all the subsequent AUs in decoding order), provided each parameter set is available (either in the bitstream or by external means not specified in this Specification) when it is referenced.

No RADL subpictures shall be present in the bitstream that are associated with an IDR subpicture having nal_unit_type equal to IDR_N_LP.

Any picture, with nuh_layer_id equal to a particular value layerId, that precedes an IRAP picture with nuh_layer_id equal to layerId in decoding order shall precede the IRAP picture in output order and shall precede any RADL picture associated with the IRAP picture in output order.

Any subpicture, with nuh_layer_id equal to a particular value layerId and subpicture index equal to a particular value subpicIdx, that precedes, in decoding order, an IRAP subpicture with nuh_layer_id equal to layerId and subpicture index equal to subpicIdx shall precede, in output order, the IRAP subpicture and all its associated RADL subpictures.

Any picture, with nuh_layer_id equal to a particular value layerId, that precedes a recovery point picture with nuh_layer_id equal to layerId in decoding order shall precede the recovery point picture in output order.

Any subpicture, with nuh_layer_id equal to a particular value layerId and subpicture index equal to a particular value subpicIdx, that precedes, in decoding order, a subpicture with nuh_layer_id equal to layerId and subpicture index equal to subpicIdx in a recovery point picture shall precede that subpicture in the recovery point picture in output order.

Any RASL picture associated with a CRA picture shall precede any RADL picture associated with the CRA picture in output order.

Any RASL subpicture associated with a CRA subpicture shall precede any RADL subpicture associated with the CRA subpicture in output order.

Any RASL picture, with nuh_layer_id equal to a particular value layerId, associated with a CRA picture shall follow, in output order, any IRAP or GDR picture with nuh_layer_id equal to layerId that precedes the CRA picture in decoding order.

Any RASL subpicture, with nuh_layer_id equal to a particular value layerId and subpicture index equal to a particular value subpicIdx, associated with a CRA subpicture shall follow, in output order, any IRAP or GDR subpicture, with nuh_layer_id equal to layerId and subpicture index equal to subpicIdx, that precedes the CRA subpicture in decoding order.

If sps_field_seq_flag is equal to 0, the following applies: when the current picture, with nuh_layer_id equal to a particular value layerId, is a leading picture associated with an IRAP picture, it shall precede, in decoding order, all non-leading pictures that are associated with the same IRAP picture. Otherwise (sps_field_seq_flag is equal to 1), let picA and picB be the first and the last leading pictures, in decoding order, associated with an IRAP picture, respectively, there shall be at most one non-leading picture with nuh_layer_id equal to layerId preceding picA in decoding order, and there shall be no non-leading picture with nuh_layer_id equal to layerId between picA and pick in decoding order.

If sps_field_seq_flag is equal to 0, the following applies: when the current subpicture, with nuh_layer_id equal to a particular value layerId and subpicture index equal to a particular value subpicIdx, is a leading subpicture associated with an IRAP subpicture, it shall precede, in decoding order, all non-leading subpictures that are associated with the same IRAP subpicture. Otherwise (sps_field_seq_flag is equal to 1), let subpicA and subpicB be the first and the last leading subpictures, in decoding order, associated with an IRAP subpicture, respectively.

there shall be at most one non-leading subpicture with nuh_layer_id equal to layerId and subpicture index equal to subpicIdx preceding subpicA in decoding order, and there shall be no non-leading picture with nuh_layer_id equal to layerId and subpicture index equal to subpicIdx between picA and picB in decoding order.

It should be noted that generally, an Intra Random Access Point (IRAP) picture is a picture that does not refer to any pictures other than itself for prediction in its decoding process. In JVET-T2001, an IRAP picture may be a clean random access (CRA) picture or an instantaneous decoder refresh (IDR) picture. In JVET-T2001, the first picture in the bitstream in decoding order must be an IRAP or a gradual decoding refresh (GDR) picture. JVET-T2001 describes the concept of a leading picture, which is a picture that precedes the associated IRAP picture in output order. JVET-T2001 further describes the concept of a trailing picture which is a non-IRAP picture that follows the associated IRAP picture in output order. Trailing pictures associated with an IRAP picture also follow the IRAP picture in decoding order. For IDR pictures, there are no trailing pictures that require reference to a picture decoded prior to the IDR picture. JVET-T2001 provides where a CRA picture may have leading pictures that follow the CRA picture in decoding order and contain inter picture prediction references to pictures decoded prior to the CRA picture. Thus, when the CRA picture is used as a random access point these leading pictures may not be decodable and are identified as random access skipped leading (RASL) pictures. The other type of picture that can follow an IRAP picture in decoding order and precede it in output order is the random access decodable leading (RADL) picture, which cannot contain references to any pictures that precede the IRAP picture in decoding order. A GDR picture, is a picture for which each VCL NAL unit has nal_unit_type equal to GDR_NUT. If the current picture is a GDR picture that is associated with a picture header which signals a syntax element recovery_poc_cnt and there is a picture picA that follows the current GDR picture in decoding order in the CLVS and that has PicOrderCntVal equal to the PicOrderCntVal of the current GDR picture plus the value of recovery_poc_cnt, the picture picA is referred to as the recovery point picture.

Further, it should be noted that JVET-P2001 provides the following definitions:

associated GDR picture: The previous GDR picture (when present) in decoding order, for a particular picture with nuh_layer_id equal to a particular value layerId, that has nuh_layer_id equal to layerId and between which and the particular picture in decoding order there is no IRAP picture with nuh_layer_id equal to layerId.

associated IRAP picture: The previous IRAP picture (when present) in decoding order, for a particular picture with nuh_layer_id equal to a particular value layerId, that has nuh_layer_id equal to layerId and between which and the particular picture in decoding order there is no GDR picture with nuh_layer_id equal to layerId.

clean random access (CRA) picture: An IRAP picture for which each VCL NAL unit has nal_unit_type equal to CRA NUT.

NOTE—A CRA picture does not refer to any pictures other than itself for inter prediction in its decoding process, and may be the first picture in the bitstream in decoding order, or may appear later in the bitstream. A CRA picture may have associated RADL or RASL pictures. When a CRA picture has NoIncorrectPicOutputFlag equal to 1, the associated RASL pictures are not output by the decoder, because they may not be decodable, as they may contain references to pictures that are not present in the bitstream.

coded layer video sequence start (CLVSS) picture: A coded picture that is an IRAP picture with NoIncorrectPicOutputFlag equal to 1 or a GDR picture with NoIncorrectPicOutputFlag equal to 1.

gradual decoding refresh (GDR) picture: A picture for which each VCL NAL unit has nal_unit_type equal to GDR_NUT.

instantaneous decoding refresh (IDR) picture: An IRAP picture for which each VCL NAL unit has nal_unit_type equal to IDR_W_RADL or IDR_N_LP.

NOTE—An IDR picture does not refer to any pictures other than itself for inter prediction in its decoding process, and may be the first picture in the bitstream in decoding order, or may appear later in the bitstream. Each IDR picture is the first picture of a CVS in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

inter-layer reference picture (ILRP): A picture in the same access unit with the current picture, with nuh_layer_id less than the nuh_layer_id of the current picture, and is marked as "used for long-term reference".

intra random access point (IRAP) picture: A coded picture for which all VCL NAL units have the same value of nal_unit_type in the range of IDR_W_RADL to CRA_NUT, inclusive.

NOTE—An IRAP picture does not refer to any pictures other than itself for inter prediction in its decoding process, and may be a CRA picture or an IDR picture. The first picture in the bitstream in decoding order must be an IRAP or GDR picture. Provided the necessary parameter sets are available when they need to be referenced, the IRAP picture and all subsequent non-RASL pictures in the CVS in decoding order can be correctly decoded without performing the decoding process of any pictures that precede the IRAP picture in decoding order.

NOTE—The value of mixed_nalu_types_in_pic_flag for an IRAP picture is equal to 0. When mixed_nalu_types_ in_pic_flag is equal to 0 for a picture, and any slice of the picture has nal_unit_type in the range of IDR_W_RADL to CRA_NUT, inclusive, all other slices of the picture have the same value of nal_unit_type, and the picture is known to be an IRAP picture.

leading picture: A picture that precedes the associated IRAP picture in output order.

long-term reference picture (LTRP): A picture with nuh_layer_id equal to the nuh_layer_id of the current picture and that is marked as "used for long-term reference".

output order: The order of pictures or subpictures within a CLVS indicated by increasing POC values, and for decoded pictures that are output from DPB, this is the order in which the decoded pictures are output from the DPB.

random access decodable leading (RADL) picture: A coded picture for which each VCL NAL unit has nal_unit_type equal to RADL_NUT.

NOTE—All RADL pictures are leading pictures. RADL pictures are not used as reference pictures for the decoding process of trailing pictures of the same associated IRAP picture. When field_seq_flag is equal to 0 all RADL pictures, when present, precede, in decoding order, all non-leading pictures of the same associated IRAP picture.

random access skipped leading (RASL) picture: A coded picture for which there is at least one VCL NAL unit with nal_unit_type equal to RASL_NUT and other VCL NAL units all have nal_unit_type equal to RASL_NUT or RADL_ NUT.

NOTE—All RASL pictures are leading pictures of an associated CRA picture. When the associated CRA picture has NoOutputBeforeRecoveryFlag equal to 1, the RASL picture is not output and might not be correctly decodable, as the RASL picture could contain references to pictures that are not present in the bitstream. RASL pictures are not used as reference pictures for the decoding process of non-RASL pictures in the same layer, except that a RADL subpicture, when present, in a RASL picture in the same layer could be used for inter prediction of the collocated RADL subpicture in a RADL picture that is associated with the same CRA picture as the RASL picture. When sps_field_seq_flag is equal to 0, all RASL pictures, when present, precede, in decoding order, all non-leading pictures of the same associated CRA picture.

reference index: An index into a reference picture list.

reference picture: A picture that is a short-term reference picture, a long-term reference picture, or an inter-layer reference picture.

NOTE—A reference picture contains samples that could be used for inter prediction in the decoding process of subsequent pictures in decoding order.

reference picture list (RPL): A list of reference pictures that is used for inter prediction of a P or B slice.

NOTE—Two RPLs, RPL 0 and RPL 1, are generated for each slice of a picture. The set of unique pictures referred to by all entries in the two RPLs associated with a picture consists of all reference pictures that could be used for inter prediction of the associated picture or any picture following the associated picture in decoding order. For the decoding process of a P slice, only RPL 0 is used for inter prediction. For the decoding process of a B slice, both RPL 0 and RPL 1 are used for inter prediction. For decoding the slice data of an I slice, no RPL is used for for inter prediction.

reference picture list 0: The reference picture list used for inter prediction of a P slice or the first of the two reference picture lists used for inter prediction of a B slice.

reference picture list 1: The second reference picture list used for inter prediction of a B slice.

short-term reference picture (STRP): A picture with nuh_layer_id equal to the nuh_layer_id of the current picture and that is marked as "used for short-term reference".

trailing picture: A picture for which each VCL NAL unit has nal_unit_type equal to TRAIL_NUT.

NOTE—Trailing pictures associated with an IRAP or GDR picture also follow the IRAP or GDR picture in decoding order. Pictures that follow the associated IRAP picture in output order and precede the associated IRAP picture in decoding order are not allowed.

As provided in Table 2, a NAL unit may include a sequence parameter set syntax structure. As described above, previously decoded pictures may be organized into one or more reference pictures lists and identified using a reference picture index value. JVET-T2001 includes a ref_pic_list_struct( ) syntax structure for signaling a reference picture list. A ref_pic_list_struct( ) syntax structure may be present in a Sequence Parameter Set (SPS) or ref_pic_lists( ) syntax structure which may be present in a picture header or a slice header. Table 3 illustrates the relevant portion of the syntax structure of the SPS provided in JVET-T2001 including the ref_pic_list_struct( ) syntax structure.

TABLE 3

| | Descriptor |
|---|---|
| seq_parameter_set_rbsp( ) { | |
| sps_seq_parameter_set_id | u(4) |
| sps_video_parameter_set_id | u(4) |
| sps_max_sublayers_minus1 | u(3) |
| sps_chroma_format_idc | u(2) |
| sps_log2_ctu_size_minus5 | u(2) |
| sps_ptl_dpb_hrd_params_present_flag | u(1) |
| if( sps_ptl_dpb_hrd_params_present_flag ) | |
| profile_tier_level( 1, sps_max_sublayers_minus1 ) | |
| sps_gdr_enabled_flag | u(1) |
| sps_ref_pic_resampling_enabled_flag | u(1) |
| if( sps_ref_pic_resampling_enabled_flag ) | |
| sps_res_change_in_clvs_allowed_flag | u(1) |
| sps_pic_width_max_in_luma_samples | ue(v) |
| sps_pic_height_max_in_luma_samples | ue(v) |
| ... | |
| sps_log2_max_pic_order_cnt_lsb_minus4 | u(4) |
| sps_poc_msb_cycle_flag | u(1) |
| if( sps_poc_msb_cycle_flag ) | |
| sps_poc_msb_cycle_len_minus1 | ue(v) |
| ... | |
| sps_weighted_pred_flag | u(1) |
| sps_weighted_bipred_flag | u(1) |
| sps_long_term_ref_pics_flag | u(1) |
| if( sps_video_parameter_set_id > 0 ) | |
| sps_inter_layer_prediction_enabled_flag | u(1) |
| sps_idr_rpl_present_flag | u(1) |
| sps_rpl1_same_as_rpl0_flag | u(1) |
| for( i = 0; i < ( sps_rpl1_same_as_rpl0_flag ? 1 : 2 ); i++ ) { | |
| sps_num_ref_pic_lists[ i ] | ue(v) |
| for( j = 0; j < sps_num_ref_pic_lists[ i ]; j++) | |
| ref_pic_list_struct( i, j ) | |
| } | |
| ... | |
| } | |

With respect to Table 3, JVET-T2001 provides the following semantics:

An SPS RBSP shall be available to the decoding process prior to it being referenced, included in at least one AU with TemporalId equal to 0 or provided through external means.

All SPS NAL units with a particular value of sps_seq_parameter_set_id in a CVS shall have the same content.

sps_seq_parameter_set_id provides an identifier for the SPS for reference by other syntax elements. SPS NAL units, regardless of the nuh_layer_id values, share the same value space of sps_seq_parameter_set_id. Let spsLayerId be the value of the nuh_layer_id of a particular SPS NAL unit, and vclLayerId be the value of the nuh_layer_id of a particular VCL NAL unit. The particular VCL NAL unit shall not refer to the particular SPS NAL unit unless spsLayerId is less than or equal to vclLayerId and all OLSs specified by the VPS that contain the layer with nuh_layer_id equal to vclLayerId also contain the layer with nuh_layer_id equal to spsLayerId.

NOTE—In a CVS that contains only one layer, the nuh_layer_id of referenced SPSs is equal to the nuh_layer_id of the VCL NAL units.

sps_video_parameter_set_id, when greater than 0, specifies the value of vps_video_parameter_set_id for the VPS referred to by the SPS.

When sps_video_parameter_set_id is equal to 0, the following applies:

The SPS does not refer to a VPS, and no VPS is referred to when decoding each CLVS referring to the SPS.

The value of vps_max_layers_minus1 is inferred to be equal to 0.

The CVS shall contain only one layer (i.e., all VCL NAL unit in the CVS shall have the same value of nuh_layer_id).

The value of GeneralLayerIdx[nuh_layer_id] is set equal to 0.

The value of vps_independent_layer_flag[GeneralLayerIdx[nuh_layer_id]] is inferred to be equal to 1.

The value of TotalNumOlss is set equal to 1, the value of NumLayersInOls[0] is set equal to 1, and value of vps_layer_id[0] is inferred to be equal to the value of nuh_layer_id of all the VCL NAL units, and the value of LayerIdInOls[0][0] is set equal to vps_layer_id[0].

NOTE—When sps_video_parameter_set_id is equal to 0, the phrase "layers specified by the VPS" used in the specification refers to the only present layer that has nuh_layer_id equal to vps_layer_id[0], and the phrase "OLSs specified by the VPS" used in the specification refers to the only present OLS that has OLS index equal to 0 and LayerIdInOls[0][0] equal to vps_layer_id[0].

When vps_independent_layer_flag[GeneralLayerIdx[nuh_layer_id]] is equal to 1, the SPS referred to by a CLVS with a particular nuh_layer_id value nuhLayerId shall have nuh_layer_id equal to nuhLayerId.

The value of sps_video_parameter_set_id shall be the same in all SPSs that are referred to by CLVSs in a CVS.

sps_max_sublayers_minus1 plus 1 specifies the maximum number of temporal sublayers that could be present in each CLVS referring to the SPS.

If sps_video_parameter_set_id is greater than 0, the value of sps_max_sublayers_minus1 shall be in the range of 0 to vps_max_sublayers_minus1, inclusive.

Otherwise (sps_video_parameter_set_id is equal to 0), the following applies:

The value of sps_max_sublayers_minus1 shall be in the range of 0 to 6, inclusive.

The value of vps_max_sublayers_minus1 is inferred to be equal to sps_max_sublayers_minus1.

The value of NumSubLayersInLayerInOLS[0][0] is inferred to be equal to sps_max_sublayers_minus1+1.

The value of vps_ols_ptl_idx[0] is inferred to be equal to 0, and the value of vps_ptl_max_tid[vps_ols_ptl_idx[0]], i.e., vps_ptl_max_tid[0], is inferred to be equal to sps_max_sublayers_minus1.

sps_chroma_format_idc specifies the chroma sampling relative to the luma sampling as specified.

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_chroma_format_idc shall be less than or equal to the value of vps_ols_dpb_chroma_format[i].

sps_log2_ctu_size_minus5 plus 5 specifies the luma coding tree block size of each CTU. The value of sps_log2_ctu_size_minus5 shall be in the range of 0 to 2, inclusive. The value 3 for sps_log2_ctu_size_minus5 is reserved for future use by ITU-T|ISO/IEC. Decoders conforming to this version of this Specification shall ignore the CLVSs with sps_log2_ctu_size_minus5 equal to 3.

The variables CtbLog2SizeY and CtbSizeY are derived as follows:

```
CtbLog2SizeY = sps_log2_ctu_size_minus5 + 5
CtbSizeY = 1 << CtbLog2SizeY
```

sps_ptl_dpb_hrd_params_present_flag equal to 1 specifies that a profile_tier_level( ) syntax structure and a dpb_parameters( ) syntax structure are present in the SPS, and a general_timing_hrd_parameters( ) syntax structure and an ols_timing_hrd_parameters( ) syntax structure could also be present in the SPS. sps_ptl_dpb_hrd_params_present_flag equal to 0 specifies that none of these four syntax structures is present in the SPS.

When sps_video_parameter_set_id is greater than 0 and there is an OLS that contains only one layer with nuh_layer_id equal to the nuh_layer_id of the SPS, or when sps_video_parameter_set_id is equal to 0, the value of sps_ptl_dpb_hrd_params_present_flag shall be equal to 1.

sps_gdr_enabled_flag equal to 1 specifies that GDR pictures are enabled and could be present in the CLVS. sps_gdr_enabled_flag equal to 0 specifies that GDR pictures are disabled and not present in the CLVS.

sps_ref_pic_resampling_enabled_flag equal to 1 specifies that reference picture resampling is enabled and a current picture referring to the SPS might have slices that refer to a reference picture in an active entry of an RPL that has one or more of the following seven parameters different than that of the current picture: 1) pps_pic_width_in_luma_samples, 2) pps_pic_height_in_luma_samples, 3) pps_scaling_win_left_offset, 4) pps_scaling_win_right_offset, 5) pps_scaling_win_top_offset, 6) pps_scaling_win_bottom_offset, and 7) sps_num_subpics_minus1. sps_ref_pic_resampling_enabled_flag equal to 0 specifies that reference picture resampling is disabled and no current picture referring to the SPS has slices that refer to a reference picture in an active entry of an RPL that has one or more of these seven parameters different than that of the current picture.

NOTE—When sps_ref_pic_resampling_enabled_flag is equal to 1, for a current picture the reference picture that has one or more of these seven parameters different than that of the current picture could either belong to the same layer or a different layer than the layer containing the current picture.

sps_res_change_in_clvs_allowed_flag equal to 1 specifics that the picture spatial resolution might change within a CLVS referring to the SPS. sps_res_change_in_clvs_allowed_flag equal to 0 specifies that the picture spatial resolution does not change within any CLVS referring to the SPS. When not present, the value of sps_res_change_in_clvs_allowed_flag is inferred to be equal to 0.

sps_pic_width_max_in_luma_samples specifies the maximum width, in units of luma samples, of each decoded picture referring to the SPS. sps_pic_width_max_in_luma_samples shall not be equal to 0 and shall be an integer multiple of Max(8, MinCbSizeY).

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_pic_width_max_in_luma_samples shall be less than or equal to the value of vps_ols_dpb_pic_width[i].

sps_pic_height_max_in_luma_samples specifies the maximum height, in units of luma samples, of each decoded picture referring to the SPS. sps_pic_height_max_in_luma_samples shall not be equal to 0 and shall be an integer multiple of Max(8, MinCbSizeY).

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_pic_height_max_in_luma_samples shall be less than or equal to the value of vps_ols_dpb_pic_height[i].

sps_log2_max_pic_order_cnt_lsb_minus4 specifies the value of the variable MaxPicOrderCntLsb that is used in the decoding process for picture order count as follows:

$$\mathrm{Max}PicOrderCntLsb = 2^{(sps\_log2\_max\_pic\_order\_cnt\_lsb\_minus4+4)}$$

The value of sps_log2_max_pic_order_cnt_lsb_minus4 shall be in the range of 0 to 12, inclusive.

sps_poc_msb_cycle_flag equal to 1 specifies that the ph_poc_msb_cycle_present_flag syntax element is present in PH syntax structures referring to the SPS. sps_poc_msb_cycle_flag equal to 0 specifies that the ph_poc_msb_cycle_present_flag syntax element is not present in PH syntax structures referring to the SPS.

sps_poc_msb_cycle_len_minus1 plus 1 specifies the length, in bits, of the ph_poc_msb_cycle_val syntax elements, when present in PH syntax structures referring to the SPS. The value of sps_poc_msb_cycle_len_minus1 shall be in the range of 0 to 32—sps_log2_max_pic_ order_cnt_lsb_minus4—5, inclusive.

sps_weighted_pred_flag equal to 1 specifies that weighted prediction might be applied to P slices referring to the SPS. sps_weighted_pred_flag equal to 0 specifies that weighted prediction is not applied to P slices referring to the SPS.

sps_weighted_bipred_flag equal to 1 specifies that explicit weighted prediction might be applied to B slices referring to the SPS. sps_weighted_bipred_flag equal to 0 specifies that explicit weighted prediction is not applied to B slices referring to the SPS.

sps_long_term_ref_pics_flag equal to 0 specifies that no LTRP is used for inter prediction of any coded picture in the CLVS. sps_long_term_ref_pics_flag equal to 1 specifies that LTRPs might be used for inter prediction of one or more coded pictures in the CLVS.

ref_pic_list_struct(listIdx, rplsIdx) syntax structure directly signalled in the picture headers or slice headers of a current picture.

Table 4 illustrates the syntax of the ref_pic_list_struct( ) as provided in JVET-T2001.

TABLE 4

| | Descriptor |
|---|---|
| ref_pic_list_struct( listIdx, rplsIdx ) { | |
| num_ref_entries[ listIdx ][ rplsIdx ] | ue(v) |
| if( sps_long_term_ref_pics_flag && rplsIdx < sps_num_ref_pic_lists[ listIdx ] && num_ref_entries[ listIdx ][ rplsIdx ] > 0 ) | |
| ltrp_in_header_flag[ listIdx ][ rplsIdx ] | u(1) |
| for( i = 0, j = 0; i < num_ref_entries[ listIdx ][ rplsIdx ]; i++) { | |
| if( sps_inter_layer_prediction_enabled_flag ) | |
| inter_layer_ref_pic_flag[ listIdx ][ rplsIdx ][ i ] | u(1) |
| if( !inter_layer_ref_pic_flag[ listIdx ][ rplsIdx ][ i ] ) { | |
| if( sps_long_term_ref_pics_flag ) | |
| st_ref_pic_flag[ listIdx ][ rplsIdx ][ i ] | u(1) |
| if( st_ref_pic_flag[ listIdx ][ rplsIdx ][ i ] ) { | |
| abs_delta_poc_st[ listIdx ][ rplsIdx ][ i ] | ue(v) |
| if( AbsDeltaPocSt[ listIdx ][ rplsIdx ][ i ] > 0 ) | |
| strp_entry_sign_flag[ listIdx ][ rplsIdx ][ i ] | u(1) |
| } else if( !ltrp_in_header_flag[ listIdx ][ rplsIdx ] ) | |
| rpls_poc_lsb_lt[ listIdx ][ rplsIdx ][ j++ ] | u(v) |
| } else | |
| ilrp_idx[ listIdx ][ rplsIdx ][ i ] | ue(v) |
| } | |
| } | |

sps_inter_layer_prediction_enabled_flag equal to 1 specifies that inter-layer prediction is enabled for the CL VS and ILRPs might be used for inter prediction of one or more coded pictures in the CLVS. sps_inter_layer_prediction_enabled_flag equal to 0 specifies that inter-layer prediction is disabled for the CLVS and no ILRP is used for inter prediction of any coded picture in the CLVS. When sps_video_parameter_set_id is equal to 0, the value of sps_inter_layer_prediction_enabled_flag is inferred to be equal 0. When vps_independent_layer_flag[GeneralLayerIdx[nuh_layer_id]] is equal to 1, the value of sps_inter_layer_prediction_enabled_flag shall be equal to 0.

sps_idr_rpl_present_flag equal to 1 specifies that RPL syntax elements could be present in slice headers of slices with nal_unit_type equal to IDR_N_LP or IDR_W_RADL, sps_idr_rpl_present_flag equal to 0 specifies that RPL syntax elements are not present in slice headers of slices with nal_unit_type equal to IDR_N_LP or IDR_W_RADL.

sps_rpl1_same_as_rpl0_flag equal to 1 specifies that the syntax element sps_num_ref_pic_lists[1] and the syntax structure ref_pic_list_struct(1, rplsIdx) are not present and the following applies:

The value of sps_num_ref_pic_lists[1] is inferred to be equal to the value of sps_num_ref_pic_lists[0].

The value of each of syntax elements in ref_pic_list_struct(1, rplsIdx) is inferred to be equal to the value of corresponding syntax element in ref_pic_list_struct(0, rplsIdx) for rplsIdx ranging from 0 to sps_num_ref_pic_lists[0]−1.

sps_num_ref_pic_lists[i] specifies the number of the ref_pic_list_struct(listIdx, rplsIdx) syntax structures with listIdx equal to i included in the SPS. The value of sps_num_ref_pic_lists[i] shall be in the range of 0 to 64, inclusive.

NOTE—For each value of listIdx (equal to 0 or 1), a decoder could allocate memory for a total number of sps_num_ref_pic_lists[i]+1 ref_pic_list_struct(listIdx, rplsIdx) syntax structures since there could be one With respect to Table 4, JVET-T2001 provides the following semantics:

The ref_pic_list_struct(listIdx, rplsIdx) syntax structure could be present in an SPS, in a PH syntax structure, or in a slice header. Depending on whether the syntax structure is included in an SPS, a PH syntax structure, or a slice header, the following applies:

If present in a PH syntax structure or slice header, the ref_pic_list_struct(listIdx, rplsIdx) syntax structure specifies RPL listIdx of the current picture (i.e., the coded picture containing the PH syntax structure or slice header).

Otherwise (present in an SPS), the ref_pic_list_struct (listIdx, rplsIdx) syntax structure specifies a candidate for RPL listIdx, and the term "the current picture" in the semantics specified in the remainder of this clause refers to each picture that 1) has a PH syntax structure or one or more slices containing rpl_idx[listIdx] equal to an index into the list of the ref_pic_list_struct (listIdx, rplsIdx) syntax structures included in the SPS, and 2) is in a CLVS that refers to the SPS.

num_ref_entries[listIdx][rplsIdx] specifies the number of entries in the ref_pic_list_struct(listIdx, rplsIdx) syntax structure. The value of num_ref_entries[listIdx][rplsIdx] shall be in the range of 0 to MaxDpbSize+13, inclusive, where MaxDpbSize is as specified.

ltrp_in_header_flag[listIdx][rplsIdx] equal to 0 specifies that the POC LSBs of the LTRP entries indicated in the ref_pic_list_struct(listIdx, rplsIdx) syntax structure are present in the same syntax structure. ltrp_in_header_flag[listIdx][rplsIdx] equal to 1 specifies that the POC LSBs of the LTRP entries indicated in the ref_pic_list_struct(listIdx, rplsIdx) syntax structure are not present in the same syntax structure. When sps_long_term_ref_pics_flag is equal to 1 and rplsIdx is equal to sps_num_ref_pic_lists[listIdx], the value of ltrp_in_header_flag[listIdx][rplsIdx] is inferred to be equal to 1.

inter_layer_ref_pic_flag[listIdx][rplsIdx][i] equal to 1 specifies that the i-th entry in the ref_pic_list_struct(listIdx, rplsIdx) syntax structure is an ILRP entry, inter_layer_ref_pic_flag[listIdx][rplsIdx][i] equal to 0) specifies that the i-th entry in the ref_pic_list_struct(listIdx, rplsIdx) syntax structure is not an ILRP entry. When not present, the value of inter_layer_ref_pic_flag[listIdx][rplsIdx][i] is inferred to be equal to 0.

st_ref_pic_flag[listIdx][rplsIdx][i] equal to 1 specifies that the i-th entry in the ref_pic_list_struct(listIdx, rplsIdx) syntax structure is an STRP entry. st_ref_pic_flag[listIdx][rplsIdx][i] equal to 0 specifies that the i-th entry in the ref_pic_list_struct(listIdx, rplsIdx) syntax structure is an LTRP entry. When inter_layer_ref_pic_flag[listIdx][rplsIdx][i] is equal to 0 and st_ref_pic_flag[listIdx][rplsIdx][i] is not present, the value of st_ref_pic_flag[listIdx][rplsIdx][i] is inferred to be equal to 1.

The variable NumLtrpEntries[listIdx][rplsIdx] is derived as follows:

```
for( i = 0, NumLtrpEntries[ listIdx ][ rplsIdx ] = 0; i < num_ref_entries[ listIdx ][ rplsIdx ]; i++ )
    if( !inter_layer_ref_pic_flag[ listIdx ][ rplsIdx ][ i ] && !st_ref_pic_flag[ listIdx ][ rplsIdx ][ i ] )
      NumLtrpEntries[ listIdx ][ rplsIdx ]++
```

abs_delta_poc_st[listIdx][rplsIdx][i] specifies the value of the variable AbsDeltaPocSt[listIdx][rplsIdx][i] as follows:

```
if( ( sps_weighted_pred_flag | | sps_weighted_bipred_flag ) && i != 0 )
  AbsDeltaPocSt[ listIdx ][ rplsIdx ][ i ] = abs_delta_poc_st[ listIdx ][ rplsIdx ][ i ]
else
  AbsDeltaPocSt[ listIdx ][ rplsIdx ][ i ] = abs_delta_poc_st[ listIdx ][ rplsIdx ][ i ] + 1
```

The value of abs_delta poc_st[listIdx][rplsIdx][i] shall be in the range of 0 to $2^{15}-1$, inclusive.

strp_entry_sign_flag[listIdx][rplsIdx][i] equal to 0 specifies that DeltaPocValSt[listIdx][rplsIdx] is greater than or equal to 0. strp_entry_sign_flag[listIdx][rplsIdx][i] equal to 1 specifies that DeltaPocValSt[listIdx][rplsIdx] is less than 0. When not present, the value of strp_entry_sign_flag[listIdx][rplsIdx][i] is inferred to be equal to 0.

The list DeltaPocValSt[listIdx][rplsIdx] is derived as follows:

```
for( i = 0; i < num_ref_entries[ listIdx ][ rplsIdx ]; i++ )
  if( !inter_layer_ref_pic_flag[ listIdx ][ rplsIdx ][ i ] && st_ref_pic_flag[ listIdx ] [ rplsIdx ][ i ] )
DeltaPocValSt[ listIdx ][ rplsIdx ][ i ] = ( 1 - 2 * strp_entry_sign_flag[ listIdx ][ rplsIdx ][ i ] ) *
    AbsDeltaPocSt[ listIdx ][ rplsIdx ][ i ]
```

rpls_poc_lsb_lt[listIdx][rplsIdx][i] specifies the value of the picture order count modulo MaxPicOrderCntLsb of the picture referred to by the i-th entry in the ref_pic_list_struct (listIdx, rplsIdx) syntax structure. The length of the rpls_poc_lsb_lt[listIdx][rplsIdx][i] syntax element is sps_log2_max_pic_order_cnt_lsb_minus4+4 bits.

ilrp_idx[listIdx][rplsIdx][i] specifies the index, to the list of the direct reference layers, of the ILRP entry of the i-th entry in the ref_pic_list_struct(listIdx, rplsIdx) syntax structure. The value of ilrp_idx[listIdx][rplsIdx][i] shall be in the range of 0 to NumDirectRefLayers[GeneralLayerIdx[nuh_layer_id]]−1, inclusive.

As described above, in JVET-T2001 a ref_pic_list_struct( ) syntax structure may be present in a ref_pic_lists( ) syntax structure. Table 5 illustrates the syntax of the ref_pic_lists( ) as provided in JVET-T2001.

TABLE 5

| | Descriptor |
|---|---|
| ref_pic_lists( ) { | |
| for(i = 0; i < 2; i++ ) { | |
| if( sps_num_ref_pic_lists[ i ] > 0 && | |
| ( i = = 0 \|\| ( i = = 1 && pps_rpl1_idx_present_flag ) ) ) | |
| rpl_sps_flag[ i ] | u(1) |
| if( rpl_sps_flag[ i ] ) { | |
| if( sps_num_ref_pic_lists[ i ] > 1 && | |
| ( i = = 0 \|\| ( i = = 1 && pps_rpl1_idx_present_flag ) ) ) | |
| rpl_idx[ i ] | u(v) |

TABLE 5-continued

| | Descriptor |
|---|---|
| } else | |
| ref_pic_list_struct( i, sps_num_ref_pic_lists[ i ] ) | |
| for( j = 0; j < NumLtrpEntries[ i ][ RplsIdx[ i ] ]; j++ ) { | |
| if( ltrp_in_header_flag[ i ][ RplsIdx[ i ] ] ) | |
| poc_lsb_lt[ i ][ j ] | u(v) |
| delta_poc_msb_cycle_present_flag[ i ][ j ] | u(1) |
| if( delta_poc_msb_cycle_present_flag[ i ][ j ] ) | |
| delta_poc_msb_cycle_lt[ i ][ j ] | ue(v) |
| } | |
| } | |
| } | |

With respect to Table 5, JVET-T2001 provides the following semantics:

The ref_pic_lists( ) syntax structure could be present in the PH syntax structure or the slice header.

rpl_sps_flag[i] equal to 1 specifies that RPL i in ref_pic_lists( ) is derived based on one of the ref_pic_list_struct (listIdx, rplsIdx) syntax structures with listIdx equal to i in the SPS. rpl_sps_flag[i] equal to 0 specifies that RPL i of the picture is derived based on the ref_pic_list_struct(listIdx, rplsIdx) syntax structure with listIdx equal to i that is directly included in ref_pic_lists( ).

When rpl_sps_flag[i] is not present, it is inferred as follows:

- If sps_num_ref_pic_lists[ i ] is equal to 0, the value of rpl_sps_flag[ i ] is inferred to be equal to 0.
- Otherwise (sps_num_ref_pic_lists[ i ] is greater than 0), when pps_rpl1_idx_present_flag is equal to 0 and i is equal to 1, the value of rpl_sps_flag[ 1 ] is inferred to be equal to rpl_sps_flag[ 0 ].

rpl_idx[i] specifies the index, into the list of the ref_pic_list_struct(listIdx, rplsIdx) syntax structures with listIdx equal to i included in the SPS, of the ref_pic_list_struct (listIdx, rplsIdx) syntax structure with listIdx equal to i that is used for derivation of RPL i of the current picture or slice. The syntax element rpl_idx[i] is represented by Ceil(Log 2(sps_num_ref_pic_lists[i])) bits.

When rpl_sps_flag[i] is equal to 1 and sps_num_ref_pic_lists[i] is equal to 1, the value of rpl_idx[i] is inferred to be equal to 0. When rpl_sps_flag[1] is equal to 1 and pps_rpl1_idx_present_flag is equal to 0, the value of rpl_idx [1] is inferred to be equal to rpl_idx[0].

The value of rpl_idx[i] shall be in the range of 0 to sps_num_ref_pic_lists[i]−1, inclusive.

The variable RplsIdx[i] is derived as follows:

*RplsIdx*[*i*] = rpl_sps_flag[*i*]?rpl_idx[*i*]: sps_num_ref_pic_lists[*i*]

When pps_rpl_info_in_ph_flag is equal to 1 and ph_inter_slice_allowed_flag is equal to 1, the value of num_ref_entries[0][RplsIdx[0]] shall be greater than 0.

poc_lsb_lt[i][j] specifies the value of the picture order count modulo MaxPicOrderCntLsb of the j-th LTRP entry in the i-th RPL in the ref_pic_lists( ) syntax structure. The length of the poc_lsb_lt[i][j] syntax element is sps_log 2_max_pic_order_cnt_lsb_minus4+4 bits.

The variable PocLsbLt[i][j] is derived as follows:

```
PocLsbLt[ i ][ j ] = ltrp_in_header_flag[ i ][ RplsIdx[ i ] ] ?
        poc_lsb_lt[ i ][ j ] : rpls_poc_lsb_lt[ i ][ RplsIdx[ i ] ][ j ]
```

delta_poc_msb_cycle_present_flag[i][j] equal to 1 specifies that delta_poc_msb_cycle_lt[i][j] is present.

delta_poc_msb_cycle_present_flag[i][j] equal to 0 specifies that delta_poc_msb_cycle_lt[i][j] is not present.

Let prevTid0Pic be the previous picture in decoding order that has nuh_layer_id the same as the slice or picture header referring to the ref_pic_lists( ) syntax structure, has TemporalId and ph_non_ref_pic_flag both equal to 0, and is not a RASL or RADL picture. Let setOfPrevPocVals be a set consisting of the following:

the PicOrderCntVal of prevTid0Pic, the PicOrderCntVal of each picture that is referred to by entries in RefPicList[0] or RefPicList[1] of prevTid0Pic and has nuh_layer_id the same as the current picture, the PicOrderCntVal of each picture that follows prevTid0Pic in decoding order, has nuh_layer_id the same as the current picture, and precedes the current picture in decoding order.

When there is more than one value in setOfPrevPocVals for which the value modulo MaxPicOrderCntLsb is equal to PocLsbLt[i][j], the value of delta_poc_msb_cycle present_flag[i][j] shall be equal to 1.

delta_poc_msb_cycle_lt[i][j] specifies the value of the variable FullPocLt[i][j] as follows:

```
if( j == 0 )
    deltaPocMsbCycleLt[ i ][ j ] = delta_poc_msb_cycle_lt[ i ][ j ]
else
    deltaPocMsbCycleLt[ i ][ j ] = delta_poc_msb_cycle_lt[ i ][ j ] + deltaPocMsbCycleLt[ i ][ j − 1]
FullPocLt[ i ][ j ] = PicOrderCntVal − deltaPocMsbCycleLt[ i ][ j ] * MaxPicOrderCntLsb −
        ( PicOrderCntVal & ( MaxPicOrderCntLsb − 1 ) ) + PocLsbLt[ i ][ j ]
```

The value of delta_poc_msb_cycle_lt[i][j] shall be in the range of 0 to $2^{(32-sps\_log2\_max\_pic\_order\_cnt\_lsb\_minus4-4)}$, inclusive. When not present, the value of delta_poc_msb_cycle_lt[i][j] is inferred to be equal to 0.

As provided in Table 2, a NAL unit may include a picture parameter set syntax structure. As further described above, a ref_pic_list_struct( ) syntax structure may be present in SPS or a slice header. A picture parameter set syntax structure indicates whether a ref_pic_list_struct( ) syntax structure is in a slice header. Table 6 illustrates the relevant portion of the syntax structure of the PPS provided in JVET-T2001 indicating whether a ref_pic_list_struct( ) syntax structure is present in a slice header.

TABLE 6

| | Descriptor |
|---|---|
| pic_parameter_set_rbsp( ) { | |
| pps_pic_parameter_set_id | u(6) |
| pps_seq_parameter_set_id | u(4) |
| pps_mixed_nalu_types_in_pic_flag | u(1) |
| pps_pic_width_in_luma_samples | ue(v) |
| pps_pic_height_in_luma_samples | ue(v) |
| ... | |
| pps_no_pic_partition_flag | u(1) |
| ... | |
| for( i = 0; i < 2; i++ ) | |
| pps_num_ref_idx_default_active_minus1[ i ] | ue(v) |
| pps_rpl1_idx_present_flag | u(1) |
| pps_weighted_pred_flag | u(1) |
| pps_weighted_bipred_flag | u(1) |
| ... | |
| if( !pps_no_pic_partition_flag ) { | |
| pps_rpl_info_in_ph_flag | u(1) |
| pps_sao_info_in_ph_flag | u(1) |
| pps_alf_info_in_ph_flag | u(1) |
| if( ( pps_weighted_pred_flag \|\| pps_weighted_bipred_flag ) && pps_rpl_info_in_ph_flag ) | |
| pps_wp_info_in_ph_flag | u(1) |
| pps_qp_delta_info_in_ph_flag | u(1) |
| } | |
| ... | |
| } | |

With respect to Table 6, JVET-T2001 provides the following semantics:

A PPS RBSP shall be available to the decoding process prior to it being referenced, included in at least one AU with TemporalId less than or equal to the TemporalId of the PPS NAL unit or provided through external means. All PPS NAL units with a particular value of pps_pic_parameter_set_id within a PU shall have the same content.

pps_pic_parameter_set_id identifies the PPS for reference by other syntax elements.

PPS NAL units, regardless of the nuh_layer_id values, share the same value space of pps_pic_parameter_set_id.

Let ppsLayerId be the value of the nuh_layer_id of a particular PPS NAL unit, and vclLayerId be the value of the nuh_layer_id of a particular VCL NAL unit. The particular VCL NAL unit shall not refer to the particular PPS NAL unit unless ppsLayerId is less than or equal to vclLayerId and all OLSs specified by the VPS that contain the layer with nuh_layer_id equal to vclLayerId also contain the layer with nuh_layer_id equal to ppsLayerId.

NOTE—In a CVS that contains only one layer, the nuh_layer_id of referenced PPSs is equal to the nuh_layer_id of the VCL NAL units.

pps_seq_parameter_set_id specifies the value of sps_seq parameter_set_id for the SPS. The value of pps_seq_parameter_set_id shall be in the range of 0 to 15, inclusive. The value of pps_seq_parameter_set_id shall be the same in all PPSs that are referred to by coded pictures in a CLVS.

pps_mixed_nalu_types_in_pic_flag equal to 1 specifies that each picture referring to the PPS has more than one VCL NAL unit and the VCL NAL units do not have the same value of nal_unit_type pps_mixed_nalu_types_in_pic_flag equal to 0 specifies that each picture referring to the PPS has one or more VCL NAL units and the VCL NAL units of each picture referring to the PPS have the same value of nal_unit_type.

NOTE—pps_mixed_nalu_types_in_pic_flag equal to 1 indicates that pictures referring to the PPS contain slices with different NAL unit types, e.g., coded pictures originating from a subpicture bitstream merging operation for which encoders have to ensure matching bitstream structure and further alignment of parameters of the original bitstreams. One example of such alignments is as follows: When the value of sps_idr_rpl_present_flag is equal to 0 and pps_mixed_nalu_types_in_pic_flag is equal to 1, a picture referring to the PPS might not have slices with nal_unit_type equal to IDR_W_RADL or IDR_N_LP.

pps_pic_width_in_luma_samples specifies the width of each decoded picture referring to the PPS in units of luma samples. pps_pic_width_in_luma_samples shall not be equal to 0, shall be an integer multiple of Max(8, MinCbSizeY), and shall be less than or equal to sps_pic_width_max_in_luma_samples.

When sps_res_change_in_clvs_allowed_flag equal to 0, the value of pps_pic_width_in_luma_samples shall be equal to sps_pic_width_max_in_luma_samples.

When sps_ref_wraparound_enabled_flag is equal to 1, the value of (CtbSizeY/MinCbSizeY+1) shall be less than or equal to the value of (pps_pic_width_in_luma_samples/MinCbSizeY−1).

pps_pic_height_in_luma_samples specifies the height of each decoded picture referring to the PPS in units of luma samples. pps_pic_height_in_luma_samples shall not be equal to 0 and shall be an integer multiple of Max(8, MinCbSizeY), and shall be less than or equal to sps_pic_height_max_in_luma_samples.

When sps_res_change_in_clvs_allowed_flag equal to 0, the value of pps_pic_height_in_luma_samples shall be equal to sps_pic_height_max_in_luma_samples.

The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

```
PicWidthInCtbsY = Ceil( pps_pic_width_in_luma_samples ÷ CtbSizeY )
PicHeightInCtbsY = Ceil( pps_pic_height_in_luma_samples ÷ CtbSizeY )
PicSizeInCtbsY = PicWidthInCtbsY * PicHeightInCtbsY
PicWidthInMinCbsY = pps_pic_width_in_luma_samples / MinCbSizeY
PicHeightInMinCbsY = pps_pic_height_in_luma_samples / MinCbSizeY
PicSizeInMinCbsY = PicWidthInMinCbsY * PicHeightInMinCbsY
PicSizeInSamplesY = pps_pic_width_in_luma_samples * pps_pic_height_in_luma_samples
PicWidthInSamplesC = pps_pic_width_in_luma_samples / Sub WidthC
PicHeightInSamplesC = pps_pic_height_in_luma_samples / SubHeightC
```

pps_no_pic_partition_flag equal to 1 specifies that no picture partitioning is applied to each picture referring to the PPS. pps_no_pic_partition_flag equal to 0 specifies that each picture referring to the PPS might be partitioned into more than one tile or slice.

pps_num_ref_idx_default_active_minus1[i] plus 1, when i is equal to 0, specifics the inferred value of the variable NumRefIdxActive[0] for P or B slices with sh_num_ref_idx_active_override_flag equal to 0, and, when i is equal to 1, specifies the inferred value of NumRefIdxActive[1] for B slices with sh_num_ref_idx_active_override_flag equal to 0. The value of pps_num_ref_idx_default_active_minus1[i] shall be in the range of 0 to 14, inclusive.

pps_rpl1_idx_present_flag equal to 0 specifies that rpl_sps_flag[1] and rpl_idx[1] are not present in the PH syntax structures or the slice headers for pictures referring to the PPS. pps_rpl1_idx_present_flag equal to 1 specifies that rpl_sps_flag[1] and rpl_idx[1] could be present in the PH syntax structures or the slice headers for pictures referring to the PPS.

pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted_pred_flag shall be equal to 0.

pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

pps_rpl_info_in_ph_flag equal to 1 specifies that RPL information is present in the PH syntax structure and not present in slice headers referring to the PPS that do not contain a PH syntax structure. pps_rpl_info_in_ph_flag equal to 0 specifies that RPL information is not present in the PH syntax structure and could be present in slice headers referring to the PPS. When not present, the value of pps_rpl_info_in_ph_flag is inferred to be equal to 0.

pps_sao_info_in_ph_flag equal to 1 specifies that SAO filter information could be present in the PH syntax structure and not present in slice headers referring to the PPS that do not contain a PH syntax structure. pps_sao_info_in_ph_flag equal to 0 specifies that SAO filter information is not present in the PH syntax structure and could be present in slice headers referring to the PPS. When not present, the value of pps_sao_info_in_ph_flag is inferred to be equal to 0.

pps_alf_info_in_ph_flag equal to 1 specifies that ALF information could be present in the PH syntax structure and not present in slice headers referring to the PPS that do not contain a PH syntax structure. pps_alf_info_in_ph_flag equal to 0 specifies that ALF information is not present in the PH syntax structure and could be present in slice headers referring to the PPS. When not present, the value of pps_alf_info_in_ph_flag is inferred to be equal to 0.

pps_wp_info_in_ph_flag equal to 1 specifies that weighted prediction information could be present in the PH syntax structure and not present in slice headers referring to the PPS that do not contain a PH syntax structure. pps_wp_info_in_ph_flag equal to 0 specifies that weighted prediction information is not present in the PH syntax structure and could be present in slice headers referring to the PPS. When not present, the value of pps_wp_info_in_ph_flag is inferred to be equal to 0.

pps_qp_delta_info_in_ph_flag equal to 1 specifies that QP delta information is present in the PH syntax structure and not present in slice headers referring to the PPS that do not contain a PH syntax structure. pps_qp_delta_info_in_ph_flag equal to 0 specifies that QP delta information is not present in the PH syntax structure and is present in slice headers referring to the PPS. When not present, the value of pps_qp_delta_info_in_ph_flag is inferred to be equal to 0.

As described above, a ref_pic_lists( ) syntax structure which may be present in a picture header. Table 7 illustrates the relevant portion of the syntax structure of the picture header provided in JVET-T2001 including the ref_pic_lists ( ) syntax structure.

TABLE 7

| | Descriptor |
|---|---|
| picture_header_structure( ) { | |
| ph_gdr_or_irap_pic_flag | u(1) |
| ph_non_ref_pic_flag | u(1) |
| if( ph_gdr_or_irap_pic_flag ) | |
| ph_gdr_pic_flag | u(1) |
| ph_inter_slice_allowed_flag | u(1) |
| if( ph_inter_slice_allowed_flag ) | |
| ph_intra_slice_allowed_flag | u(1) |
| ph_pic_parameter_set_id | ue(v) |
| ph_pic_order_cnt_lsb | u(v) |
| if( ph_gdr_pic_flag ) | |
| ph_recovery_poc_cnt | uc(v) |
| for( i = 0; i < NumExtraPhBits; i++ ) | |
| ph_extra_bit[ i ] | u(1) |
| if( sps_poc_msb_cycle_flag ) { | |
| ph_poc_msb_cycle_present_flag | u(1) |
| if( ph_poc_msb_cycle_present_flag ) | |
| ph_poc_msb_cycle_val | u(v) |
| } | |
| ... | |
| if( pps_rpl_info_in_ph_flag ) | |
| ref_pic_lists( ) | |
| ... | |
| presenceFlag = 0 | |
| if( !pps_rpl_info_in_ph_flag ) /* This condition is intentionally not merged into the next, to avoid possible interpretation of RplsIdx[ i ] not having a specified value. */ | |
| presenceFlag = 1 | |
| else if( num_ref_entries[ 1 ][ RplsIdx[ 1 ] ] > 0 ) | |
| presenceFlag = 1 | |
| ... | |
| } | |

With respect to Table 7, JVET-T2001 provides the following semantics:

The PH syntax structure contains information that is common for all slices of the current picture.

ph_gdr_or_irap_pic_flag equal to 1 specifies that the current picture is a GDR or IRAP picture. ph_gdr_or_irap_pic_flag equal to 0 specifies that the current picture is not a GDR picture and might or might not be an IRAP picture.

ph_non_ref_pic_flag equal to 1 specifies that the current picture is never used as a reference picture. ph_non_ref_pic_flag equal to 0 specifies that the current picture might or might not be used as a reference picture.

ph_gdr_pic_flag equal to 1 specifies that the current picture is a GDR picture. ph_gdr_pic_flag equal to 0 specifies that the current picture is not a GDR picture. When not present, the value of ph_gdr_pic_flag is inferred to be equal to 0. When sps_gdr_enabled_flag is equal to 0, the value of ph_gdr_pic_flag shall be equal to 0.

NOTE—When ph_gdr_or_irap_pic_flag is equal to 1 and ph_gdr_pic_flag is equal to 0, the current picture is an IRAP picture.

ph_inter_slice_allowed_flag equal to 0 specifies that all coded slices of the picture have sh_slice_type equal to 2. ph_inter_slice_allowed_flag equal to 1 specifies that there might or might not be one or more coded slices in the picture that have sh_slice_type equal to 0 or 1.

When ph_gdr_or_irap_pic_flag is equal to 1 and ph_gdr_pic_flag is equal to 0 (i.e., the picture is an IRAP picture), and vps_independent_layer_flag[GeneralLayerIdx [nuh_layer_id]] is equal to 1, the value of ph_inter_slice_allowed_flag shall be equal to 0.

ph_intra_slice_allowed_flag equal to 0 specifies that all coded slices of the picture have sh_slice_type equal to 0 or 1. ph_intra_slice_allowed_flag equal to 1 specifies that there might or might not be one or more coded slices in the picture that have sh_slice_type equal to 2. When not present, the value of ph_intra_slice_allowed_flag is inferred to be equal to 1.

NOTE—For bitstreams that are supposed to work for subpicture based bitstream merging without the need of changing PH NAL units, the encoder is expected to set the values of both ph_inter_slice_allowed_flag and ph_intra_slice_allowed_flag equal to 1.

ph_pic_parameter_set_id specifies the value of pps_pic_parameter_set_id for the PPS in use. The value of ph_pic_parameter_set_id shall be in the range of 0 to 63, inclusive.

It is a requirement of bitstream conformance that the value of TemporalId of the PH shall be greater than or equal to the value of TemporalId of the PPS that has pps_pic_parameter_set_id equal to ph_pic_parameter_set_id.

ph_pic_order_cnt_lsb specifies the picture order count modulo MaxPicOrderCntLsb for the current picture. The length of the ph_pic_order_cnt_lsb syntax element is sps_log2_max_pic_order_cnt_lsb_minus4+4 bits. The value of the ph_pic_order_cnt_lsb shall be in the range of 0 to MaxPicOrderCntLsb−1, inclusive.

ph_recovery_poc_cnt specifies the recovery point of decoded pictures in output order.

When the current picture is a GDR picture, the variable recoveryPointPocVal is derived as follows:

$$recoveryPointPocVal = PicOrderCntVal + \text{ph\_recovery\_poc\_cnt}$$

If the current picture is a GDR picture and ph_recovery_poc_cnt is equal to 0, the current picture itself is also referred to as the recovery point point. Otherwise, if the current picture is a GDR picture, and there is a picture picA that follows the current GDR picture in decoding order in the CLVS that has PicOrderCntVal equal to recoveryPointPocVal, the picture picA is referred to as the recovery point picture, otherwise, the first picture in output order that has PicOrderCntVal greater than recoveryPointPocVal in the CLVS is referred to as the recovery point picture. The recovery point picture shall not precede the current GDR picture in decoding order. The pictures that are associated with the current GDR picture and have PicOrderCntVal less than recoveryPointPocVal are referred to as the recovering pictures of the GDR picture. The value of ph_recovery_poc_cnt shall be in the range of 0 to MaxPicOrderCntLsb−1, inclusive.

NOTE—When sps_gdr_enabled_flag is equal to 1 and PicOrderCntVal of the current picture is greater than or equal to recoveryPointPocVal of the associated GDR picture, the current and subsequent decoded pictures in output order are exact match to the corresponding pictures produced by starting the decoding process from the previous IRAP picture, when present, preceding the associated GDR picture in decoding order.

ph_extra_bit[i] could have any value. Decoders conforming to this version of this Specification shall ignore the presence and value of ph_extra_bit[i]. Its value does not affect the decoding process specified in this version of this Specification.

ph_poc_msb_cycle_present_flag equal to 1 specifies that the syntax element ph_poc_msb_cycle_val is present in the PH syntax structure. ph_poc_msb_cycle_present_flag equal to 0 specifies that the syntax element ph_poc_msb_cycle_val is not present in the PH syntax structure. When vps_independent_layer_flag[GeneralLayerIdx[nuh_layer_id]] is equal to 0 and there is an ILRP entry in RefPicList [0] or RefPicList[1] of a slice of the current picture, the value of ph_poc_msb_cycle_present_flag shall be equal to 0.

ph_poc_msb_cycle_val specifies the value of the POC MSB cycle of the current picture. The length of the syntax element ph_poc_msb_cycle_val is sps_poc_msb_cycle_len_ minus1+1 bits.

As described above, a ref_pic_lists( ) syntax structure which may be present in a slice header. Table 8 illustrates the relevant portion of the syntax structure of the slice header provided in JVET-T2001 including the ref_pic_lists( ) syntax structure.

TABLE 8

| | Descriptor |
|---|---|
| slice_header( ) { | |
| sh_picture_header_in_slice_header_flag | u(1) |
| if( sh_picture_header_in_slice_header_flag ) | |
| picture_header_structure( ) | |
| ... | |

TABLE 8-continued

| | Descriptor |
|---|---|
| if( !pps_rpl_info_in_ph_flag && ( ( nal_unit_type != IDR_W_RADL && nal_unit_type != IDR_N_LP ) \|\| sps_idr_rpl_present_flag ) ) | |
| ref_pic_lists( ) | |
| if( ( sh_slice_type != T && num_ref_entries[ 0 ][ RplsIdx[ 0 ] ] > 1 ) \|\| ( sh_slice_type = = B && num_ref_entries[ 1 ][ RplsIdx[ 1 ] ] > 1 ) ) { | |
| sh_num_ref_idx_active_override_flag | u(1) |
| if( sh_num_ref_idx_active_override_flag ) | |
| for( i = 0; i < ( sh_slicc_type = = B ? 2: 1 ); i++ ) | |
| if( num_ref_entries[ i ][ RplsIdx[ i ] ] > 1 ) | |
| sh_num_ref_idx_active_minus1[ i ] | ue(v) |
| } | |
| ... | |
| } | |

With respect to Table 8, JVET-T2001 provides the following semantics:

sh_picture_header_in_slice_header_flag equal to 1 specifies that the PH syntax structure is present in the slice header. sh_picture_header_in_slice_header_flag equal to 0 specifics that the PH syntax structure is not present in the slice header.

It is a requirement of bitstream conformance that the value of sh_picture_header_in_slice_header_flag shall be the same in all coded slices in a CLVS.

When sh_picture_header_in_slice_header_flag is equal to 1 for a coded slice, it is a requirement of bitstream conformance that no NAL unit with nal_unit_type equal to PH_NUT shall be present in the CLVS.

When sh_picture_header_in_slice_header_flag is equal to 0, all coded slices in the current picture shall have sh_picture_header_in_slice_header_flag equal to 0, and the current PU shall have a PH NAL unit.

When any of the following conditions is true, the value of sh_picture_header_in_slice_header_flag shall be equal to 0:

The value of sps_subpic_info_present_flag is equal to 1.

The value of pps_rect_slice_flag is equal to 0.

The value of pps_rpl_info_in_ph_flag, pps_dbf_info_in_ph_flag, pps_sao_info_in_ph_flag, pps_alf_info_in_ph_flag, pps_wp_info_in_ph_flag, or pps_qp_delta_info_in_ph_flag is equal to 1.

sh_num_ref_idx_active_override_flag equal to 1 specifies that the syntax element sh_num_ref_idx_active_minus1[0] is present for P and B slices when num_ref_entries[0][RplsIdx[0]] is greater than 1 and the syntax element sh_num_ref_idx_active_minus1[1] is present for B slices when num_ref_entries[1][RplsIdx[1]] is greater than 1. sh_num_ref_idx_active_override_flag equal to 0 specifies that the syntax elements sh_num_ref_idx_active_minus1[0] and sh_num_ref_idx_active_minus1[1] are not present. When not present, the value of sh_num_ref_idx_active_override_flag is inferred to be equal to 1.

sh_num_ref_idx_active_minus1[i] is used for the derivation of the variable NumRefIdxActive[i] as specified in the equation below. The value of sh_num_ref_idx_active_minus1[i] shall be in the range of 0 to 14, inclusive.

For i equal to 0 or 1, when the current slice is a B slice, sh_num_ref_idx_active_override_flag is equal to 1, and sh_num_ref_idx_active_minus1[i] is not present, sh_num_ref_idx_active_minus1[i] is inferred to be equal to 0.

When the current slice is a P slice, sh_num_ref_idx_active_override_flag is equal to 1, and sh_num_ref_idx_active_minus1[0] is not present, sh_num_ref_idx_active_minus1[0] is inferred to be equal to 0.

The variable NumRefIdxActive[i] is derived as follows:

```
for(i = 0; i < 2; i++ ) {
  if( sh_slice_type == B || (sh_slice_type == P && i == 0 ) ) {
    if( sh_num_ref_idx_active_override_flag )
      NumRefIdxActive[ i ] = sh_num_ref_idx_active_minus1[[ i ] + 1
    else {
      if( num_ref_entries[ i ][ RplsIdx[ i ] ] >= pps_num_ref_idx_default_active_minus]1[ i ] + 1 )
        NumRefIdxActive[ i ] = pps_num_ref_idx_default_active_minus1[[ i ] + 1
      else
        NumRefIdxActive[ i ] = num_ref_entries[ i ][ RplsIdx[ i ] ]
    }
  } else /* sh_slice_type == I | | (sh_slice_type == P && i == 1 ) */
    NumRefIdxActive[ i ] = 0
}
```

The value of NumRefIdxActive[i]−1 specifies the maximum reference index for RPL i that may be used to decode the slice. When the value of NumRefIdxActive[i] is equal to 0, no reference index for RPL i is used to decode the slice.

When the current slice is a P slice, the value of NumRefIdxActive[0] shall be greater than 0.

When the current slice is a B slice, both NumRefIdxActive[0] and NumRefIdxActive[1] shall be greater than 0.

Further, JVET-T2001 provides the following decoding process for reference picture list construction:

This process is invoked at the beginning of the decoding process for each slice of a picture.

Reference pictures are addressed through reference indices. A reference index is an index into an RPL. When decoding an I slice, no RPL is used in decoding of the slice data. When decoding a P slice, only RPL 0 (i.e., RefPicList[0]), is used in decoding of the slice data. When decoding a B slice, both RPL 0 and RPL 1 (i.e., RefPicList[1]) are used in decoding of the slice data.

At the beginning of the decoding process for each slice of a picture, the RPLs RefPicList[0] and RefPicList[1] are derived. The RPLs are used in marking of reference pictures as specified or in decoding of the slice data.

NOTE—For an I slice of a picture, RefPicList[0] and RefPicList[1] could be derived for bitstream conformance checking purpose, but their derivation is not necessary for decoding of the current picture or pictures following the current picture in decoding order. For a P slice of a picture, RefPicList[1] could be derived for bitstream conformance checking purpose, but its derivation is not necessary for decoding of the current picture or pictures following the current picture in decoding order.

If sps_idr_rpl_present_flag is equal to 0, pps_rpl_info_in_ph_flag is equal to 0, and nal_unit_type is equal to IDR_W_RADL or IDR_N_LP, the RPLs RefPicList[0] and RefPicList[1] are both derived to be empty, i.e., to contain 0 entries, and the following applies for each i equal to 0 or 1:

The value of RplsIdx[i] is inferred to be equal to sps_num_ref_pic_lists[i].

The value of num_ref_entries[i][RplsIdx[i]] is inferred to be equal to 0.

The value of NumRefIdxActive[i] is inferred to be equal to 0.

Otherwise, the RPLs RefPicList[0] and RefPicList[1], the reference picture scaling ratios RefPicScale[i][j][0] and RefPicScale[i][j][1], and the reference picture scaled flags RprConstraintsActiveFlag[0][j] and RprConstraintsActiveFlag[1][j] are derived as follows:

```
for( i = 0; i < 2; i++ ) {
  for( j = 0, k = 0, pocBase = PicOrderCntVal; j < num_ref_entries[ i ][ RplsIdx[ i ] ]; j++) {
    if( !inter_layer_ref_pic_flag[ i ][ RplsIdx[ i ] ][ j ] ) {
      if( st_ref_pic_flag[ i ][ RplsIdx[ i ] ][ j ] ) {
        RefPicPocList[ i ][ j ] = pocBase + DeltaPocValSt[ i ][ RplsIdx[ i ] ][ j ]
        if( there is a reference picture picA in the DPB with the same nuh_layer_id as the current
picture
            and PicOrderCntVal equal to RefPicPocList[ i ][ j ] )
          RefPicList[ i ][ j ] = picA
        else
          RefPicList[ i ][ j ] = "no reference picture"
        pocBase = RefPicPocList[ i ][ j ]
      } else {
          if( !delta_poc_msb_cycle_present_flag[ i ][ k ] ) {
            if( there is a reference picA in the DPB with the same nuh_layer_id as the current picture
and
                PicOrderCntVal & ( MaxPicOrderCntLsb − 1 ) equal to PocLsbLt[ i ][ k ] )
              RefPicList[ i ][ j ] = picA
            else
              RefPicList[ i ][ j ] = "no reference picture"
            RefPicLtPocList[ i ][ j ] = PocLsbLt[ i ][ k ]
          } else {
            if( there is a reference picA in the DPB with the same nuh_layer_id as the current picture
and
                PicOrderCntVal equal to FullPocLt[ i ][ k ] )
              RefPicList[ i ][ j ] = picA
            else
              RefPicList[ i ][ j ] = "no reference picture"
            RefPicLtPocList[ i ][ j ] = FullPocLt[ i ][ k ]
          }
          k++
        }
      } else {
        layerIdx = DirectRefLayerIdx[ GeneralLayerIdx[ nuh_layer_id ] ][ ilrp_idx[ i ][ RplsIdx[ i ] ][ j ] ]
        refPicLayerId = vps_layer_id[ layerIdx ]
        if( there is a reference picture picA in the DPB with nuh_layer_id equal to refPicLayerId and
            the same PicOrderCntVal as the current picture )
          RefPicList[ i ][ j ] = picA
        else
          RefPicList[ i ][ j ] = "no reference picture"
      }
      fRefWidth is set equal to CurrPicScalWinWidthL of the reference picture RefPicList[ i ][ j ]
      fRefHeight is set equal to CurrPicScalWinHeightL of the reference picture RefPicList[ i ][ j ]
      refPicWidth, refPicHeight, refScalingWinLeftOffset, refScalingWinRightOffset,
refScalingWinTopOffset,
          and refScalingWinBottomOffset, are set equal to the values of
pps_pic_width_in_luma_samples,
          pps_pic_height_in_luma_samples, pps_scaling_win_left_offset, pps_scaling_win_right_offset,
          pps_scaling_win_top_offset, and pps_scaling_win_bottom_offset, respectively, of the reference
          picture RefPicList[ i ][ j ]
      fRefNumSubpics is set equal to sps_num_subpics_minus1 of the reference picture RefPicList[ i ][ j ]
      RefPicScale[ i ][ j ][ 0 ] = ( ( fRefWidth << 14 ) + ( CurrPicScalWinWidthL >> 1 ) ) /
          CurrPicScalWinWidthL
      RefPicScale[ i ][ j ][ 1 ] = ( ( fRefHeight << 14 ) + ( CurrPicScalWinHeightL >> 1 ) ) /
          CurrPicScalWinHeightL
      RprConstraintsActiveFlag[ i ][ j ] = ( pps_pic_width_in_luma_samples != refPicWidth | |
          pps_pic_height_in_luma_samples != refPicHeight | |
          pps_scaling_win_left_offset != refScalingWinLeftOffset | |
          pps_scaling_win_right_offset != refScalingWinRightOffset | |
          pps_scaling_win_top_offset != refScalingWinTopOffset | |
          pps_scaling_win_bottom_offset != refScalingWinBottomOffset
          sps_num_subpics_minus1 != fRefNumSubpics )
  }
}
```

For each i equal to 0 or 1, the first NumRefIdxActive[i] entries in RedPicList[i] are referred to as the active entries in RefPicList[i], and the other entries in RefPicList[i] are referred to as the inactive entries in RefPicList[i].

NOTE—It is possible that a particular picture is referred to by both an entry in RefPicList[0] and a entry in RefPicList[1]. It is also possible that a particular picture is referred to by more than one entry in RefPicList [0] or by more than one entry in RefPicList[1].

NOTE—The active entries in RefPicList[0] and the active entries in RefPicList[1] collectively refer to all reference pictures that could be used for inter prediction of the current picture and one or more pictures in the same layer that follow the current picture in decoding order. The inactive entries in RefPicList[0] and the inactive entries in RefPicList[1] collectively refer to all reference pictures that are not used for inter prediction of the current picture but could be used in inter prediction for one or more pictures in the same layer that follow the current picture in decoding order.

NOTE—There could be one or more entries in RefPicList [0] or RefPicList[1] that are equal to "no reference picture" because the corresponding pictures are not present in the DPB. Each inactive entry in RefPicList [0] or RefPicList[1] that is equal to "no reference picture" is expected to be ignored. An unintentional picture loss is expected to be inferred for each active entry in RefPicList[0] or RefPicList[1] that is equal to "no reference picture".

It is a requirement of bitstream conformance that the following constraints apply:

NOTE—When the bitstream conformance is checked for some of these constraints, the conformance check is expected to be performed after invoking the decoding process for generating unavailable reference pictures as specified.

For each i equal to 0 or 1, num_ref_entries[i][RplsIdx [i]] shall not be less than NumRefIdxActive[i].

The picture referred to by each active entry in RefPicList[0] or RefPicList[1] shall be present in the DPB and shall have TemporalId less than or equal to that of the current picture.

The picture referred to by each entry in RefPicList[0] or RefPicList[1] shall not be the current picture and shall have ph_non_ref_pic_flag equal to 0.

An STRP entry in RefPicList[0] or RefPicList[1] of a slice of a picture and an LTRP entry in RefPicList[0] or RefPicList[1] of the same slice or a different slice of the same picture shall not refer to the same picture.

There shall be no LTRP entry in RefPicList[0] or RefPicList[1] for which the difference between the PicOrderCntVal of the current picture and the PicOrderCntVal of the picture referred to by the entry is greater than or equal to $2^{24}$.

Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics shall be less than or equal to MaxDpbSize−1, inclusive, where MaxDpbSize is as specified, and setOfRefPics shall be the same for all slices of a picture.

When the current slice has nal_unit_type equal to STSA_NUT, there shall be no active entry in RefPicList[0] or RefPicList[1] that has TemporalId equal to that of the current picture and nuh_layer_id equal to that of the current picture.

When the current picture is a picture that follows, in decoding order, an STSA picture that has TemporalId equal to that of the current picture and nuh_layer_id equal to that of the current picture, there shall be no picture that precedes the STSA picture in decoding order, has TemporalId equal to that of the current picture, and has nuh_layer_id equal to that of the current picture included as an active entry in RefPicList[0] or RefPicList[1].

When the current subpicture, with TemporalId equal to a particular value tId, nuh_layer_id equal to a particular value layerId, and subpicture index equal to a particular value subpicIdx, is a subpicture that follows, in decoding order, an STSA subpicture with TemporalId equal to tId, nuh_layer_id equal to layerId, and subpicture index equal to subpicIdx, there shall be no picture with TemporalId equal to tId and nuh_layer_id equal to layerId that precedes the picture containing the STSA subpicture in decoding order included as an active entry in RefPicList[0] or RefPicList[1].

When the current picture, with nuh_layer_id equal to a particular value layerId, is an IRAP picture, there shall be no picture referred to by an entry in RefPicList[0] or RefPicList[1] that precedes, in output order or decoding order, any preceding IRAP picture with nuh_layer_id equal to layerId in decoding order (when present).

When the current subpicture, with nuh_layer_id equal to a particular value layerId and subpicture index equal to a particular value subpicIdx, is an IRAP subpicture, there shall be no picture referred to by an entry in RefPicList[0] or RefPicList[1] that precedes, in output order or decoding order, any preceding picture, in decoding order (when present), containing an IRAP subpicture with nuh_layer_id equal to layerId and subpicture index equal to subpicIdx.

When the current picture is not a RASL picture associated with a CRA picture with NoOutputBeforeRecoveryFlag equal to 1, there shall be no picture referred to by an active entry in RefPicList[0] or RefPicList[1] that was generated by the decoding process for generating unavailable reference pictures for the CRA picture associated with the current picture.

When the current subpicture is not a RASL subpicture associated with a CRA subpicture in a CRA picture with NoOutputBeforeRecoveryFlag equal to 1, there shall be no picture referred to by an active entry in RefPicList[0] or RefPicList[1] that was generated by the decoding process for generating unavailable reference pictures for the CRA picture containing the CRA subpicture associated with the current subpicture.

When the current picture, with nuh_layer_id equal to a particular value layerId, is not any of the following, there shall be no picture referred to by an entry in RefPicList[0] or RefPicList[1] that was generated by the decoding process for generating unavailable reference pictures for the IRAP or GDR picture associated with the current picture:

An IDR picture with sps_idr_rpl_present_flag equal to 1 or pps_rpl_info_in_ph_flag equal to 1

A CRA picture with NoOutputBeforeRecoveryFlag equal to 1

When sps_field_seq_flag is equal to 1, a picture, associated with a CRA picture with NoOutputBeforeRecoveryFlag equal to 1, that precedes, in decoding order, all the leading pictures associated with the same CRA picture A leading picture associated with a CRA picture with NoOutputBeforeRecoveryFlag equal to 1

A GDR picture with NoOutputBeforeRecoveryFlag equal to 1

A recovering picture of a GDR picture with NoOutputBeforeRecoveryFlag equal to 1 and nuh_layer_id equal to layerId When the current subpicture, with nuh_layer_id equal to a particular value layerId and subpicture index equal to a particular value subpicIdx, is not any of the following, there shall be no picture referred to by an entry in RefPicList[0] or RefPicList[1] that was generated by the decoding process for generating unavailable reference pictures for the IRAP or GDR picture containing the IRAP or GDR subpicture associated with the current subpicture:

An IDR subpicture in an IDR picture with sps_idr_rpl_present_flag equal to 1 or pps_rpl_info_in_ph_flag equal to 1

A CRA subpicture in a CRA picture with NoOutputBeforeRecoveryFlag equal to 1.

When sps_field_seq_flag is equal to 1, a subpicture, associated with a CRA subpicture in a CRA picture with NoOutputBeforeRecoveryFlag equal to 1, that precedes, in decoding order, all the leading pictures associated with the same CRA picture A leading subpicture associated with a CRA subpicture in a CRA picture with NoOutputBeforeRecoveryFlag equal to 1

A GDR subpicture in a GDR picture with NoOutputBeforeRecoveryFlag equal to 1

A subpicture in a recovering picture of a GDR picture with NoOutputBeforeRecoveryFlag equal to 1 and nuh_layer_id equal to layerId When the current picture follows an IRAP picture having the same value of nuh_layer_id in both decoding order and output order, there shall be no picture referred to by an active entry in RefPicList[0] or RefPicList[1] that precedes that IRAP picture in output order or decoding order.

When the current subpicture follows an IRAP subpicture having the same value of nuh_layer_id and the same value of subpicture index in both decoding and output order, there shall be no picture referred to by an active entry in RefPicList[0] or RefPicList[1] that precedes the picture containing that IRAP subpicture in output order or decoding order.

When the current picture follows an IRAP picture having the same value of nuh_layer_id and all the leading pictures, if any, associated with that IRAP picture in both decoding order and output order, there shall be no picture referred to by an entry in RefPicList[0] or RefPicList[1] that precedes that IRAP picture in output order or decoding order.

When the current subpicture follows an IRAP subpicture having the same value of nuh_layer_id and the same value of subpicture index and all the leading subpictures, if any, associated with that IRAP subpicture in both decoding and output order, there shall be no picture referred to by an entry in RefPicList[0] or RefPicList[1] that precedes the picture containing that IRAP subpicture in output order or decoding order.

When the current picture is a RADL picture, there shall be no active entry in RefPicList[0] or RefPicList[1] that is any of the following:

A RASL picture with pps_mixed_nalu_types_in_pic_flag is equal to 0

NOTE—An active entry in RefPicList[0] or RefPicList[1] of the current picture that is a RADL picture could refer to a RASL picture with pps_mixed_nalu_types_in_pic_flag equal to 1 in the layer or a reference layer of the current layer. However, when decoding starts from the associated CRA picture, such a RADL picture could still be correctly decoded, because the RADL subpicture(s) in that referenced RASL picture would be correctly decoded, as the RADL picture would only refer to the RADL subpictures in the referenced RASL picture, as imposed by the next constraint that disallows RADL subpictures referring to a RASL subpicture.

A picture that precedes the associated IRAP picture of the RADL picture in decoding order When the current subpicture, with nuh_layer_id equal to a particular value layerId and subpicture index equal to a particular value subpicIdx, is a RADL subpicture, there shall be no active entry in RefPicList[0] or RefPicList[1] that is any of the following:

A picture containing a RASL subpicture with subpicture index equal to subpicIdx

A RASL picture for which the value of nuh_layer_id is not equal to layerId and the value of sps_num_subpics_minus1 is equal to 0

A picture that precedes the picture containing the associated IRAP subpicture of the RADL subpicture in decoding order The following constraints apply for the picture referred to by each ILRP entry, when present, in RefPicList[0] or RefPicList[1] of a slice of the current picture:

The picture shall be in the same AU as the current picture.

The picture shall be present in the DPB.

The picture shall have nuh_layer_id refPicLayerId less than the nuh_layer_id of the current picture.

Either of the following conditions shall apply:

The picture is a GDR picture with ph_recovery_poc_cnt equal to 0 or an IRAP picture.

The picture has TemporalId less than vps_max_tid_il_ref_pics_plus1[currLayerIdx][refLayerIdx], where currLayerIdx and refLayerIdx are equal to GeneralLayerIdx[nuh_layer_id] and GeneralLayerIdx[refpicLayerId], respectively.

Each ILRP entry, when present, in RefPicList[0] or RefPicList[1] of a slice shall be an active entry.

When sps_num_subpics_minus1 is greater than 0 and the current subpicture with subpicture index subpicIdx has sps_subpic_treated_as_pic_flag[subpicIdx] equal to 1, it is a requirement of bitstream conformance that both of the following conditions shall be true:

Exactly one and not both of the following two conditions shall be true:

The picture referred to by each active entry in RefPicList[0] or RefPicList[1] and the current picture have the same value for each of the following:

pps_pic_width_in_luma_samples pps_pic_height_in_luma_samples sps_num_subpics_minus 1 sps_log2_ctu_size_minus5 sps_subpic_ctu_top_left_x[i], sps_subpic_ctu_top_left_y[i], sps_subpic_width_minus1[i], sps_subpic_height_minus1[i], and sps_subpic_treated_as_pic_flag[i], respectively, for each value of i in the range of 0 to sps_num_subpics_minus1, inclusive SubpicIdVal[subpicIdx]

The picture referred to by each active entry in RefPicList[0] or RefPicList[1] is an ILRP entry for which the value of sps_num_subpics_minus1 is equal to 0.

The current picture and any picture that is in a different layer than the current layer and has the current picture in an active entry in RefPicList[0] or RefPicList[1] have the same value for each of the following:

pps_pic_width_in_luma_samples pps_pic_height_in_luma_samples sps_num_subpics_minus1 sps_log2_ctu_size_minus5 sps_subpic_ctu_top_left_x[i], sps_subpic_ctu_top_left_y[i], sps_subpic_width_minus1[i], sps_subpic_height_minus1[i], sps_subpic_treated_as_pic_flag[i], SubpicIdVal[i], respectively, for each value of i in the range of 0 to sps_num_subpics_minus1, inclusive.

The reference picture list signaling provided in JVET-T2001 may be less than ideal. In particular, for example, in the reference picture list signaling provided in JVET-T2001, as provided in Table 4, in a case where the zero-th entry in a reference picture list is a short-term reference picture, AbsDeltaPocSt[listIdx][rplsIdx][i]=abs_delta_poc_st[listIdx][rplsIdx][i]+1. That is, in this case, AbsDeltaPocSt is encoded using minus1 coding. However, in a case where the zero-th entry in a reference picture list is either a long-term reference picture (LTRP) entry or an inter-layer reference picture (ILRP) entry, and a short-term reference picture (STRP) entry occurs later in the reference picture list, according to the signaling provided in JVET-T2001, AbsDeltaPocSt is not encoded using minus1 coding. Thus, in JVET-T2001, the zero-th (or first occurring) short-term reference picture in a reference picture list may or may not be encoded using minus1 coding based on whether it occurs after a long-term reference picture entry and/or an inter-layer reference picture entry. This results in coding that is less efficient in some cases of reference picture list signaling.

In one example, according to the techniques herein, the syntax and/or decoding process provided in JVET-T2001 may be modified such that the zero-th (or first occurring) short-term reference picture in a reference picture list may be encoded using minus1 coding in more cases. That is, in one example, according to the techniques described herein, abs_delta_poc_st may be encoded with a minus1 coding for a short-term reference picture which is not the 0-th picture in a reference picture list. For example, according to the techniques described herein, in one example, a zero-th short-term reference picture entry at any position in a reference picture list may be encoded using minus1 coding.

As described above, JEM describes the coding features that were under coordinated test model study by the JVET as potentially enhancing video coding technology beyond the capabilities of ITU-T H.265. Similarly, Algorithm description of Enhanced Compression Model 3 (ECM 3), ISO/IEC JTC1/SC29 Document: JVET-X2025-v2, July 2021, which is incorporated by reference herein, describes the coding features that are under coordinated test model study by the JVET as potentially enhancing video coding technology beyond the capabilities of VVC. It should be noted that the coding features of ECM are implemented in ECM reference software. As used herein, the term ECM may collectively refer to algorithms included in ECM and implementations of ECM reference software. The ECM reference software utilizes reference picture list signaling similar to that provided in JVET-T2001 and as such is less than ideal in that in does not provide minus1 signaling for the zero-th short-term reference picture in a reference picture list in the cases described above. In particular, the ECM Snapshot with commit hash ac0d346f99de7f82bf3301d9591fbe31e2890bbb is shown below:

```
In VLCReader.cpp:
uint32_t numStrp = 0;
...
 for (int ii = 0; ii < numRefPic; ii++)
 {
  uint32_t isInterLayerRefPic = 0;
  if( rpl->getInterLayerPresentFlag( ) )
  {
   READ_FLAG( isInterLayerRefPic, "inter_layer_ref_pic_flag[ listIdx ][ rplsIdx ][ i ]" );
   if( isInterLayerRefPic )
   {
    READ_UVLC( code, "ilrp_idx[ listIdx ][ rplsIdx ][ i ]" );
    rpl->setRefPicIdentifier( ii, 0, true, true, code );
    numIlrp++;
   }
  }
  if( !isInterLayerRefPic )
  {
  isLongTerm = false;
  if (sps->getLongTermRefsPresent( ))
  {
   READ_FLAG(code, "st_ref_pic_flag[ listIdx ][ rplsIdx ][ i ]");
   isLongTerm = (code == 1) ? false : true;
  }
```

-continued

```
    else
      isLongTerm = false;
    if (!isLongTerm)
    {
      READ_UVLC(code, "abs_delta_poc_st[ listIdx ][ rplsIdx ][ i ]");
      if ((!sps->getUseWP( ) && !sps->getUseWPBiPred( )) || (ii == 0))
      {
        code++;
      }
      int readValue = code;
#if JVET_S0045_SIGN
      if (readValue > 0)
      {
        READ_FLAG(code, "strp_entry_sign_flag[ listIdx ][ rplsIdx ][ i ]");
        if (code)
        {
          readValue = -readValue;
        }
      }
#else
      if (readValue > 0)
        READ_FLAG(code, "strp_entry_sign_flag[ listIdx ][ rplsIdx ][ i ]");
      else
        code = 1;
      readValue = (code) ? readValue : 0 - readValue; //true means positive delta POC -- false otherwise
#endif
      if (firstSTRP)
      {
        firstSTRP = false;
        prevDelta = deltaValue = readValue;
      }
      else
      {
        deltaValue = prevDelta + readValue;
        prevDelta = deltaValue;
      }
      rpl->setRefPicIdentifier( ii, deltaValue, isLongTerm, false, 0 );
      numStrp++;
        }
    else
    {
      if (!rpl->getLtrpInSliceHeaderFlag( ))
        READ_CODE(sps->getBitsForPOC( ), code, "poc_lsb_lt[listIdx][rplsIdx][j]");
      rpl->setRefPicIdentifier( ii, code, isLongTerm, false, 0 );
      numLtrp++;
    }
    }
  }
In VLCWriter.cpp:
  for (int ii = 0; ii < numRefPic; ii++)
  {
    if( rpl->getInterLayerPresentFlag( ) )
    {
      WRITE_FLAG( rpl->isInterLayerRefPic( ii ), "inter_layer_ref_pic_flag[ listIdx ][ rplsIdx ][ i ]" );
      if( rpl->isInterLayerRefPic( ii ) )
      {
        CHECK( rpl->getInterLayerRefPicIdx( ii ) < 0, "Wrong inter-layer reference index" );
        WRITE_UVLC( rpl->getInterLayerRefPicIdx( ii ), "ilrp_idx[ listIdx ][ rplsIdx ][ i ]" );
      }
    }
    if( !rpl->isInterLayerRefPic( ii ) )
    {
    if( isLongTermPresent )
    {
      WRITE_FLAG( !rpl->isRefPicLongterm( ii ), "st_ref_pic_flag[ listIdx ][ rplsIdx ][ i ]" );
    }
    if (!rpl->isRefPicLongterm(ii))
    {
      if (firstSTRP)
      {
        firstSTRP = false;
        deltaValue = prevDelta = rpl->getRefPicIdentifier(ii);
      }
      else
      {
        deltaValue = rpl->getRefPicIdentifier(ii) - prevDelta;
        prevDelta = rpl->getRefPicIdentifier(ii);
      }
```

-continued

```
    unsigned int absDeltaValue = (deltaValue < 0) ? 0 - deltaValue : deltaValue;
    if (isForbiddenZeroDeltaPoc || ii == 0)
    {
     CHECK(!absDeltaValue, "Zero delta POC is not used without WP or is the 0-th entry");
     WRITE_UVLC( absDeltaValue - 1, "abs_delta_poc_st[ listIdx ][ rplsIdx ][ i ]" );
    }
    else
    WRITE_UVLC(absDeltaValue, "abs_delta_poc_st[ listIdx ][ rplsIdx ][ i ]");
#if JVET_S0045_SIGN
    if (absDeltaValue > 0)
    {
     WRITE_FLAG(deltaValue < 0 ? 1 : 0, "strp_entry_sign_flag[ listIdx ][ rplsIdx ][ i ]");
    }
#else
    if (absDeltaValue > 0)
     WRITE_FLAG((deltaValue < 0) ? 0 : 1, "strp_entry_sign_flag[ listIdx ][ rplsIdx ][ i ]"); //0 means negative
delta POC : 1 means positive
#endif
   }
   else if (!rpl->getLtrpInSliceHeaderFlag( ))
   {
    WRITE_CODE(rpl->getRefPicIdentifier(ii), ltLsbBitsCount, "poc_lsb_lt[listIdx][rplsIdx][i]");
   }
  }
 }
```

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
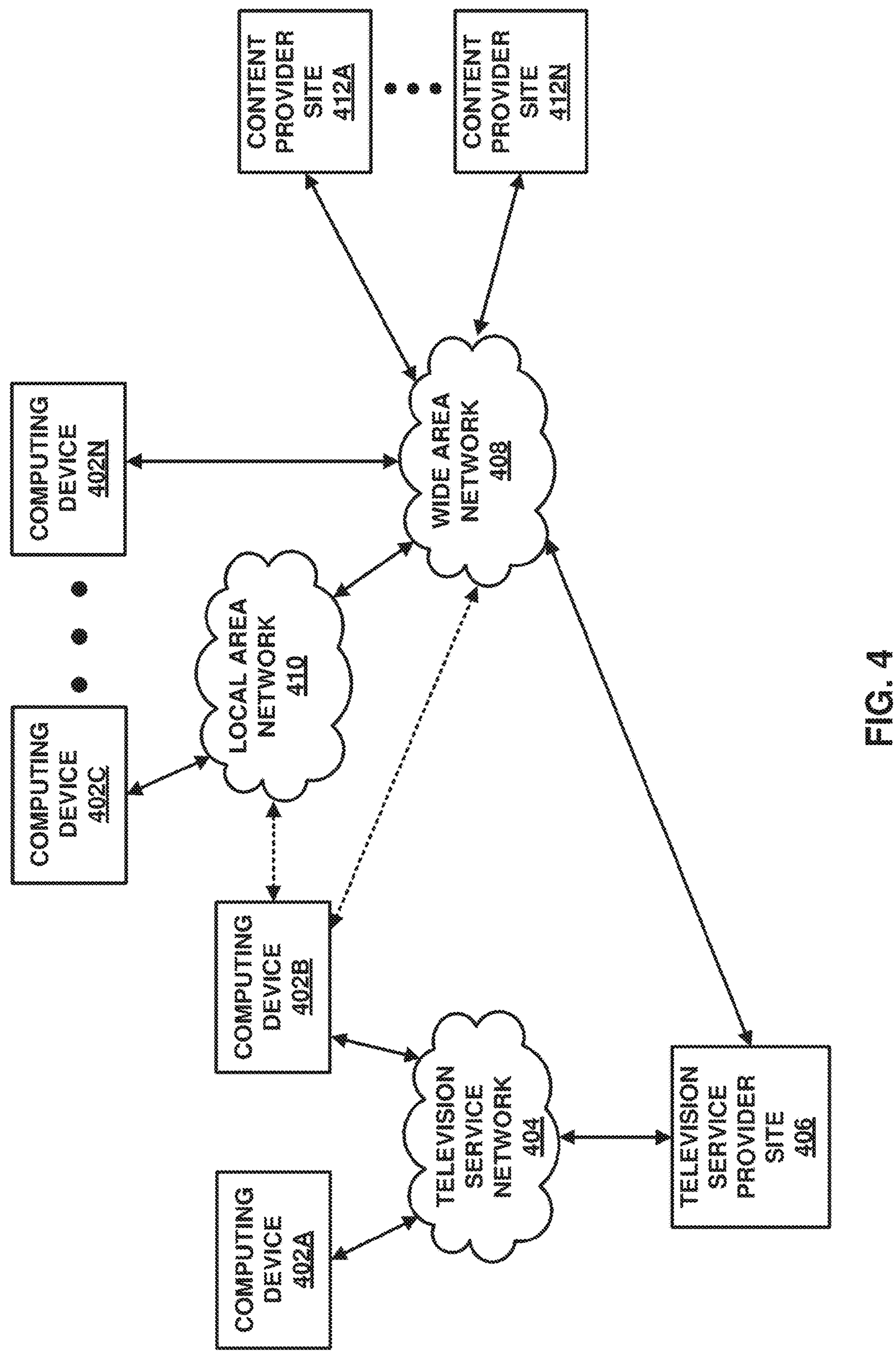
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
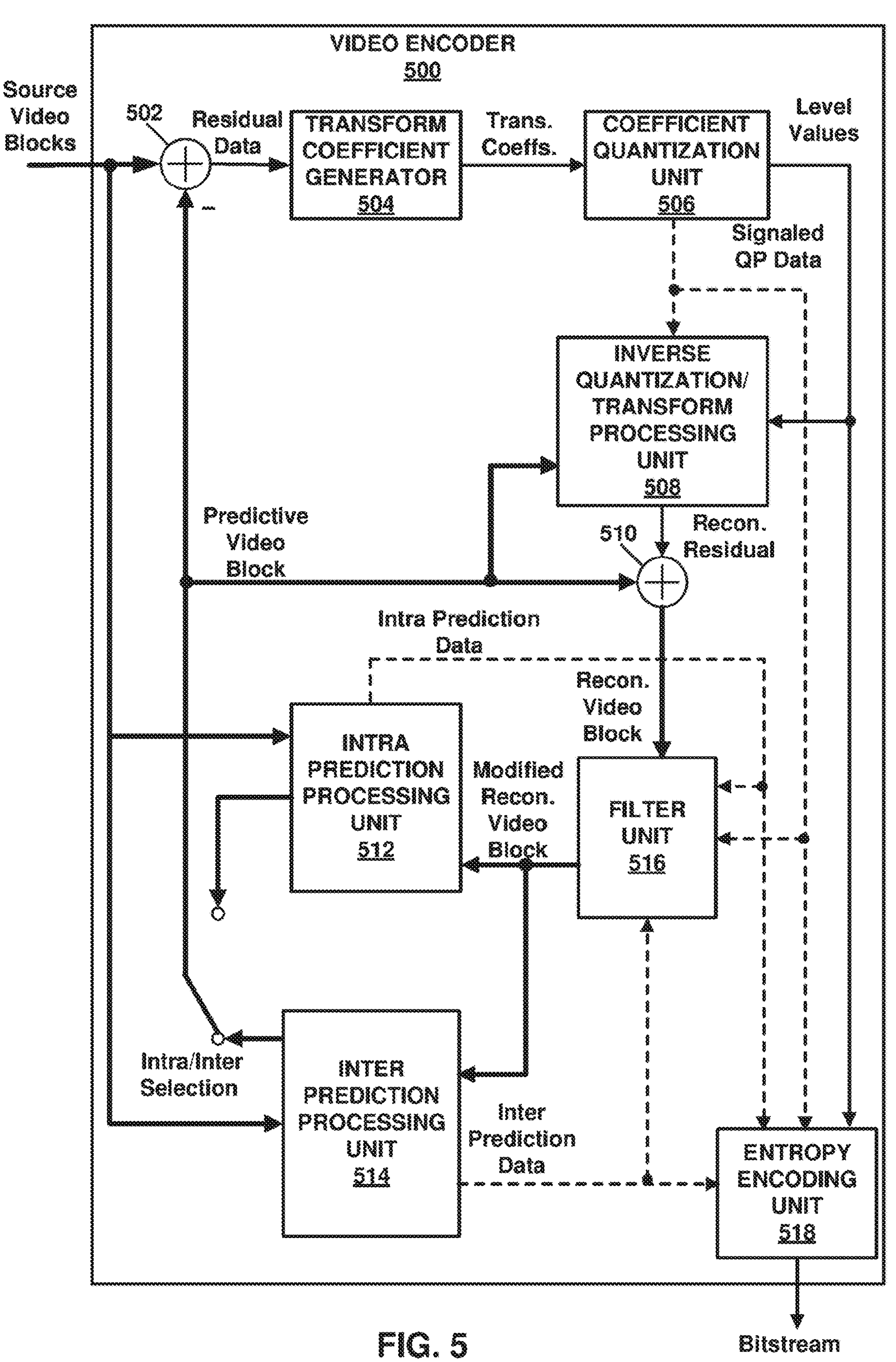
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a prediction unit of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a compliant bitstream forms a new compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

As described above, according to the techniques herein, the syntax and/or decoding process provided in JVET-T2001 may be modified such that the zero-th short-term reference picture in a reference picture list may be encoded using minus1 coding in more cases. That is, in one example, according to the techniques described herein, the condition for calculation of AbsDeltaPocSt[listIdx][rplsIdx][i] may be modified to signal the value as a "minus1" for the 0-th short term reference picture entry. It is asserted that since for the 0-th short-term reference picture entry the abs_delta_poc_st[listIdx][rplsIdx][0] specifies the delta between the picture order count values of the current picture and the picture referred to by the 0-th short-term reference picture entry, this value can be coded with a minus1 coding. This provides bit-savings as the syntax element abs_delta_poc_st[listIdx][rplsIdx][i] is ue(v) coded.

Table 9 illustrates an example of ref_pic_list_struct( ) syntax for signaling reference picture list entry information according to the techniques herein.

TABLE 9

| | Descriptor |
|---|---|
| ref_pic_list_struct( listIdx, rplsIdx ) { | |
| num_ref_entries[ listIdx ][ rplsIdx ] | ue(v) |
| if( sps_long_term_ref_pics_flag && rplsIdx < sps_num_ref_pic_lists[ listIdx ] && num_ref_entries[ listIdx ][ rplsIdx ] > 0 ) | |
| ltrp_in_header_flag[ listIdx ][ rplsIdx ] | u(1) |
| for( i = 0, j = 0, StrpEntryIdX = 0; i < num_ref_entries[ listIdx ][ rplsIdx ]; i++) { | |
| if( sps_inter_layer_prediction_enabled_flag ) | |
| inter_layer_ref_pic_flag[ listIdx ][ rplsIdx ][ i ] | u(1) |
| if( !inter_layer_ref_pic_flag[ listIdx ][ rplsIdx ][ i ] ) { | |
| if( sps_long_term_ref_pics_flag ) | |
| st_ref_pic_flag[ listIdx ][ rplsIdx ][ i ] | u(1) |
| if( st_ref_pic_flag[ listIdx ][ rplsIdx ][ i ] ) { | |
| abs_delta_poc_st[ listIdx ][ rplsIdx ][ i ] | ue(v) |
| if( AbsDeltaPocSt[ listIdx ][ rplsIdx ][ i ] > 0 ) | |
| strp_entry_sign_flag[ listIdx ][ rplsIdx ][ i ] | u(1) |
| StrpEntryIdx++ | |
| } else if( !ltrp_in_header_flag[ listIdx ][ rplsIdx ] ) | |
| rpls_poc_lsb_lt[ listIdx ][ rplsIdx ][ j++ ] | u(v) |
| } else | |
| ilrp_idx[ listIdx ][ rplsIdx ][ i ] | ue(v) |
| } | |
| } | |

With respect to Table 9, the semantics may be based on the semantics provided above with the following semantics for abs_delta_poc_st:

abs_delta_poc_st[ listIdx ][ rplsIdx ][ i ] specifies the value of the variable AbsDeltaPocSt[ listIdx ][ rplsIdx ][ i ] as follows:

```
if( ( sps_weighted_pred_flag  | |  sps_weighted_bipred_flag )  &&  StrpEntryIdx  !=  0 )
  AbsDeltaPocSt[ listIdx ][ rplsIdx ][ i ] = abs_delta_poc_st[ listIdx ][ rplsIdx ][ i ]
else
  AbsDeltaPocSt[ listIdx ][ rplsIdx ][ i ] = abs_delta_poc_st[ listIdx ][ rplsIdx ][ i ] + 1
```

The value of abs_delta poc_st[ listIdx ][ rplsIdx ][ i ] shall be in the range of 0 to $2^{15}-1$, inclusive.

In one example, according to the techniques described herein, the decoding process for reference picture Hat construction provided in JVET-T2001 my be modified such that the zero-th short-term reference picture in a reference picture list may be encoded using minus1 coding in more cases. That is, in one example, according to the techniques herein, the RPLs RefPicList[ 0 ] and RefPicList[ 1 ], the reference picture scaling ratios RefPicScale[ i ][ j ][ 0 ] and RefPicScale[ i ][ j ][ 1 ], and the reference picture scaled flags RprConstraintsActiveFlag[ 0 ][ j ] and RprConstraintsActiveFlag[ 1 ][ j ] may be derived as follows:

```
for( i = 0; i < 2; i++ ) {
  for( j = 0, k = 0, m=0, pocBase = PicOrderCntVal; j < num_ref_entries[ i ][ RplsIdx[ i ] ]; j++) {
    if( !inter_layer_ref_pic_flag[ i ][ RplsIdx[ i ] ][ j ] ) {
      if( st_ref_pic_flag[ i ][ RplsIdx[ i ] ][ j ] ) {
        RefPicPocList[ i ][ j ] = pocBase + DeltaPocValSt[ i ][ RplsIdx[ i ] ][ j ] + (m==0) ? ((
        strp_entry_sign_flag[ i ][ RplsIdx[ i ] ][ j ] ) ? -1 : 1): 0
        if( there is a reference picture picA in the DPB with the same nuh_layer_id as the current
```

-continued

```
picture
                  and PicOrderCntVal equal to RefPicPocList[ i ][ j ] )
                RefPicList[ i ][ j ] = picA
              else
                RefPicList[ i ][ j ] = “no reference picture”
              pocBase = RefPicPocList[ i ][ j ]
              m++
            } else {
              if( !delta_poc_msb_cycle_present_flag[ i ][ k ] ) {
                if( there is a reference picA in the DPB with the same nuh_layer_id as the current picture
  and
                    PicOrderCntVal & ( MaxPicOrderCntLsb − 1 ) equal to PocLsbLt[ i ][ k ] )
                  RefPicList[ i ][ j ] = picA
                else
                  RefPicList[ i ][ j ] = “no reference picture”
                RefPicLtPocList[ i ][ j ] = PocLsbLt[ i ][ k ]
              } else {
                if( there is a reference picA in the DPB with the same nuh_layer_id as the current picture
  and
                    PicOrderCntVal equal to FullPocLt[ i ][ k ] )
                  RefPicList[ i ][ j ] = picA
                else
                  RefPicList[ i ][ j ] = “no reference picture”
                RefPicLiPocList[ i ][ j ] = FullPocLt[ i ][ k ]
              }
              k++
            }
          } clsc {
            layerIdx = DirectRefLayerIdx[ GeneralLayerIdx[ nuh_layer_id ] ][ ilrp_idx[ i ][ RplsIdx[ i ] ][ j ] ]
            refPicLayerId = vps_layer_id[ layerIdx ]
            if( there is a reference picture picA in the DPB with nuh_layer_id equal to refPicLayerId and
                the same PicOrderCntVal as the current picture )
              RefPicList[ i ][ j ] = picA
            else
              RefPicList[ i ][ j ] = “no reference picture”
          }
          fRefWidth is set equal to CurrPicScalWinWidthL of the reference picture RefPicList[ i ][ j ]
          fRefHeight is set equal to CurrPicScalWinHeightL of the reference picture RefPicList[ i ][ j ]
          refPicWidth, refPicHeight, refScalingWinLeftOffset, refScalingWinRightOffset,
  refScalingWinTopOffset,
          and refScalingWinBottomOffset, are set equal to the values of
  pps_pic_width_in_luma_samples,
              pps_pic_height_in_luma_samples, pps_scaling_win_left_offset, pps_scaling_win_right_offset,
              pps_scaling_win_top_offset, and pps_scaling_win_bottom_offset, respectively, of the reference
              picture RefPicList[ i ][ j ]
          fRefNumSubpics is set equal to sps_num_subpics_minus1 of the reference picture RefPicList[ i ][ j ]
          RefPicScale[ i ][j ][ 0 ] = ( ( [RefWidth << 14 ) + ( CurrPicScalWinWidthL >> 1 ) ) /
              CurrPicScalWinWidthL
          RcfPicScale[ i ][ j ][ 1 ] = ( ( fRcfHeight << 14 ) + ( CurrPicScalWinHeightL >> 1 ) ) /
              CurrPicScalWinHeightL
          RprConstraintsActiveFlag[ i ][ j ] = ( pps_pic_width_in_luma_samples != refPicWidth | |
              pps_pic_height_in_luma_samples != refPicHeight | |
              pps_scaling_win_left_offset != refScalingWinLeftOffset | |
              pps_scaling_win_right_offset != refScalingWinRightOffset | |
              pps_scaling_win_top_offset != refScalingWinTopOffset | |
              pps_scaling_win_bottom_offset != refScalingWinBottomOffset | |
              sps_num_subpics_minus1 != fRefNumSubpics )
      }
    }
```

In one example, according to the techniques herein, ECM reference software corresponding to reference picture list entry information may be based on the following:

```
In VLCReader.cpp:
uint32_t numStrp = 0;
...
 for (int ii = 0, StrpEntryIdx = 0; ii < numRefPic; ii++)
 {
  uint32_t isInterLayerRefPic = 0;
  if( rpl->getInterLayerPresentFlag( ) )
  {
   READ_FLAG( isInterLayerRefPic, “inter_layer_ref_pic_flag[ listIdx ][ rplsIdx ][ i ]” );
   if( isInterLayerRefPic )
```

-continued

```
    {
     READ_UVLC( code, "ilrp_idx[ listIdx ][ rplsIdx ][ i ]" );
     rpl->setRefPicIdentifier( ii, 0, true, true, code );
     numIlrp++;
    }
   }
   if( !isInterLayerRefPic )
   {
   isLongTerm = false;
   if (sps->getLongTermRefsPresent( ))
   {
    READ_FLAG(code, "st_ref_pic_flag[ listIdx ][ rplsIdx ][ i ]");
    isLongTerm = (code == 1) ? false : true;
   }
   else
    isLongTerm = false;
   if (!isLongTerm)
   {
    READ_UVLC(code, "abs_delta_poc_st[ listIdx ][ rplsIdx ][ i ]");
    if ((!sps->getUseWP( ) && !sps->getUseWPBiPred( )) || (StrpEntryIdx==0))
    {
     code++;
    }
    int readValue = code;
#if JVET_S0045_SIGN
    if (readValue > 0)
    {
     READ_FLAG(code, "strp_entry_sign_flag[ listIdx ][ rplsIdx ][ i ]");
     if (code)
      readValue = -readValue;
     }
    }
#else
    if (readValue > 0)
     READ_FLAG(code, "strp_entry_sign_flag[ listIdx ][ rplsIdx ][ i ]");
    else
     code = 1;
    readValue = (code) ? readValue : 0 - readValue; //true means positive delta POC -- false otherwise
#endif
    if (firstSTRP)
    {
     firstSTRP = false;
     prevDelta = deltaValue = readValue;
    }
    else
    {
     deltaValue = prevDelta + readValue;
     prevDelta = deltaValue;
    }
    rpl->setRefPicIdentifier( ii, deltaValue, isLongTerm, false, 0 );
    numStrp++;
    StrpEntryIdx++;
     }
   else
   {
     if (!rpl->getLtrpInSliceHeaderFlag( ))
      READ_CODE(sps->getBitsForPOC( ), code, "poc_lsb_lt[listIdx] [rplsIdx][j]");
     rpl->setRefPicIdentifier( ii, code, isLongTerm, false, 0 );
     numLtrp++;
    }
    }
   }
  In VLCWriter.cpp:
   for (int ii = 0, StrpEntryIdx = 0; ii < numRefPic; ii++)
   {
    if( rpl->getInterLayerPresentFlag( ) )
    {
     WRITE_FLAG( rpl->isInterLayerRefPic( ii ), "inter_layer_ref_pic_flag[ listIdx ][ rplsIdx ][ i ]" );
     if( rpl->isInterLayerRefPic( ii ) )
     {
      CHECK( rpl->getInterLayerRefPicIdx( ii ) < 0, "Wrong inter-layer reference index" );
      WRITE_UVLC( rpl->getInterLayerRefPicIdx( ii ), "ilrp_idx[ listIdx ][ rplsIdx ][ i ]" );
     }
    }
    if( !rpl->isInterLayerRefPic( ii ) )
    {
    if( isLongTermPresent )
```

-continued

```
    {
     WRITE_FLAG( !rpl->isRefPicLongterm( ii ), "st_ref_pic_flag[ listIdx ][ rplsIdx ][ i ]" );
    }
    if (!rpl->isRefPicLongterm(ii))
    {
     if (firstSTRP)
     {
      firstSTRP = false;
      deltaValue = prevDelta = rpl->getRefPicIdentifier(ii);
     }
     else
     {
      deltaValue = rpl->getRefPicIdentifier(ii) - prevDelta;
      prevDelta = rpl->getRefPicIdentifier(ii);
     }
     unsigned int absDeltaValue = (deltaValue < 0) ? 0 - deltaValue : deltaValue;
     if (isForbiddenZeroDeltaPoc || StrpEntryIdx==0)
     {
      CHECK(!absDeltaValue, "Zero delta POC is not used without WP or is the 0-th entry");
      WRITE_UVLC( absDeltaValue - 1, "abs_delta_poc_st[ listIdx ][ rplsIdx ][ i ]" );
     }
     else
     WRITE_UVLC(absDeltaValue, "abs_delta_poc_st[ listIdx ][ rplsIdx ][ i ]");
#if JVET_S0045_SIGN
     if (absDeltaValue > 0)
     {
      WRITE_FLAG(deltaValue < 0 ?1 : 0, "strp_entry_sign_flag[ listIdx ][ rplsIdx ][ i ]");
     }
#else
     if (absDeltaValue > 0)
      WRITE_FLAG((deltaValue < 0) ? 0 : 1, "strp_entry_sign_flag[ listIdx ][ rplsIdx ][ i ]"); //0 means nega-
tive
delta POC : 1 means positive
#endif
StrpEntryIdx++;
    }
    else if (!rpl->getLtrpInSliceHeaderFlag( ))
    {
     WRITE_CODE(rpl->getRefPicIdentifier(ii), ltLsbBitsCount, "poc_lsb_lt[listIdx][rplsIdx][i]");
    }
   }
  }
```

Further, in one example. according to the techniques herein, In VLCReader.cpp:

```
        if ((!sps->getUseWP( ) && !sps->getUseWPBiPred( ) || (ii == 0))
            {
             code++;
            }
May be replaced with
        if ((!sps->getUseWP( ) && !sps->getUseWPBiPred( )) || (numStrp==0))
            {
             code++;
            }
```

Thus, according to the techniques herein, the reference picture entries may be tracked according to type (STRP or LTRP, or ILRP) and as such, minus 1 coding can be correctly applied to an instance of a syntax element corresponding to the zero-th (or first occurring) short-term reference picture entry. In particular, the techniques described herein keep track of the short-term reference picture count/index and apply the minus 1 coding to the zero-th short-term reference picture as opposed to applying it to the zero-th reference picture list entry.

In this manner, source device 102 represents an example of a device configured to signal a syntax element specifying a value for a variable specifying an absolute delta picture order count for a short term reference picture, wherein the signaled value plus one specifies the value for variable in the case that a corresponding short term reference picture is the first occurring short term reference picture in the reference picture list.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, $I^2C$, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
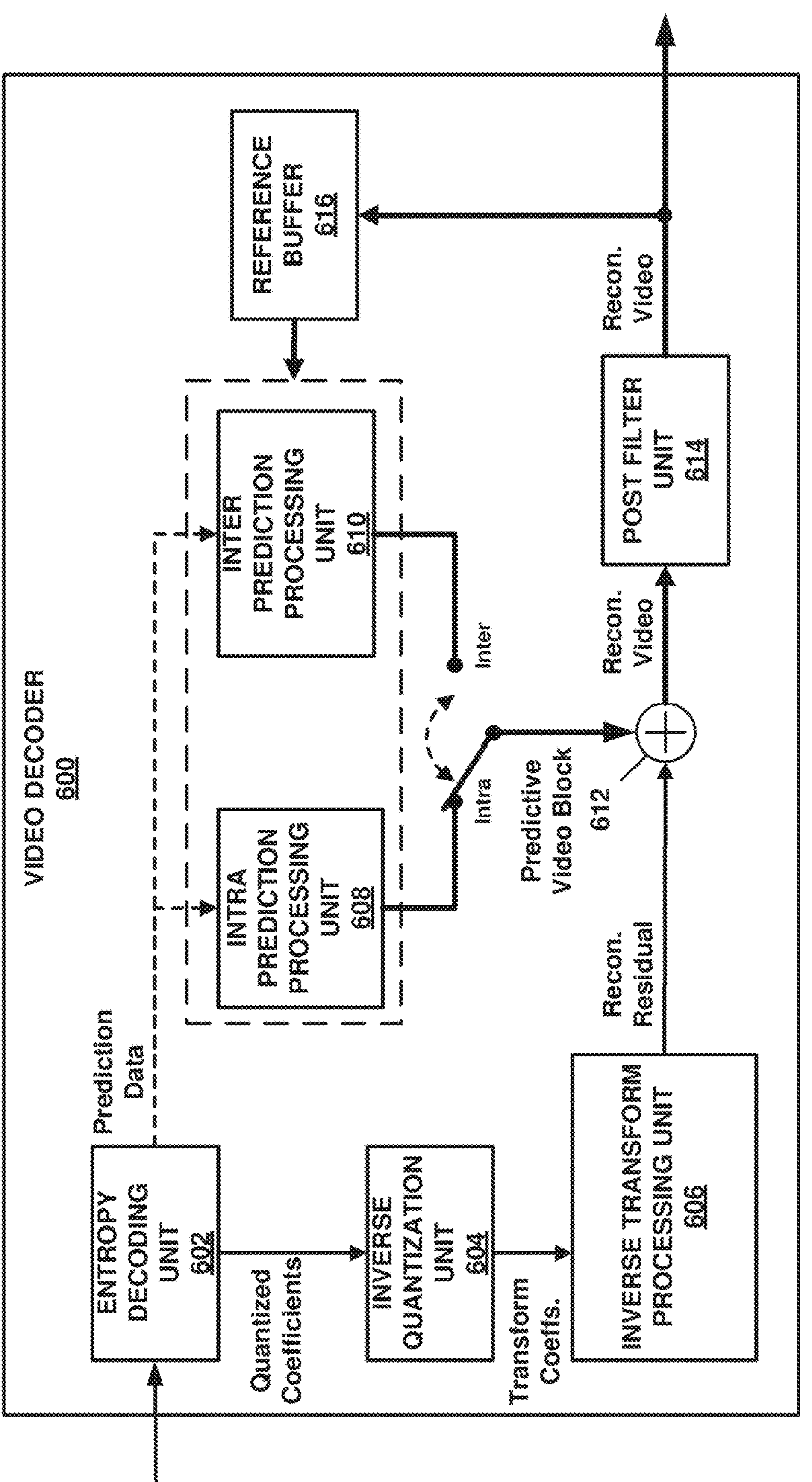
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and re-construct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-9. Video decoder 600 may decode a picture based on or according to the processes described above, and further based on parsed values in Tables 1-9.

In the example illustrated in FIG. 6, video decoder 600 includes an entropy decoding unit 602, inverse quantization unit 604, transform coefficient processing unit 606, intra prediction processing unit 608, inter prediction processing unit 610, summer 612, post filter unit 614, and reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized co-efficient values, transform data, and prediction data from a bitstream. In the example, illustrated in FIG. 6, inverse quantization unit 604 and inverse transform coefficient processing unit 606 receive quantized coefficient values from entropy decoding unit 602 and output reconstructed residual data.

Referring again to FIG. 6, reconstructed residual data may be provided to summer 612. Summer 612 may add reconstructed residual data to a predictive video block and generate reconstructed video data. A predictive video block may be determined according to a predictive video technique (i.e., intra prediction and inter frame prediction). Intra prediction processing unit 608 may be configured to receive intra prediction syntax elements and retrieve a predictive video block from reference buffer 616. Reference buffer 616 may include a memory device configured to store one or more frames of video data. Intra prediction syntax elements may identify an intra prediction mode, such as the intra prediction modes described above. Inter prediction processing unit 610 may receive inter prediction syntax elements and generate motion vectors to identify a prediction block in one or more reference frames stored in reference buffer 616. Inter prediction processing unit 610 may produce motion compensated blocks, possibly performing interpolation based on interpolation filters. Identifiers for interpolation filters to be used for motion estimation with sub-pixel precision may be included in the syntax elements. Inter prediction processing unit 610 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to receive a syntax element specifying a value for a variable specifying an absolute delta picture order count for a short term reference picture, determine whether the syntax element corresponds to a short term reference picture that is the first occurring short term reference picture in the reference picture list, and determine the value for variable as the signaled value plus in the case that the short term reference picture is the first occurring short term reference picture in the reference picture list.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:

1. A video encoder signaling reference picture list entry information for video data, the video encoder comprising:

a processor; and a memory associated with the processor, wherein:

the processor is configured to signal a syntax element, abs_delta_poc_st, in a reference picture list structure, the syntax element specifies a value for a variable specifying an absolute delta picture order count for a short term reference picture, in a case that the short term reference picture is a first occurring short term reference picture in a reference picture list and a zero-th entry in the reference picture list is a long-term reference picture entry or an inter-layer reference picture entry, the variable specifying the absolute delta picture order count for the short term reference picture is equal to the syntax element plus one, in a case that the short term reference picture is the first occurring short term reference picture in the reference picture list and the zero-th entry in the reference picture list, the variable specifying the absolute delta picture order count for the short term reference picture is equal to the syntax element plus one, and in a case that the short term reference picture is not the first occurring short term reference picture in the reference picture list, the variable specifying the absolute delta picture order count for the short term reference picture is equal to the syntax element.

2. A video decoder decoding video data, the video decoder comprising:

a processor; and a memory associated with the processor, wherein:

the processor is configured to receive a syntax element, abs_delta_poc_st, in a reference picture list structure, the syntax element specifies a value for a variable specifying an absolute delta picture order count for a short term reference picture, in a case that the short term reference picture is a first occurring short term reference picture in a reference picture list and a zero-th entry in the reference picture list is a long-term reference picture entry or an inter-layer reference picture entry, the variable specifying the absolute delta picture order count for the short term reference picture is equal to the syntax element plus one, in a case that the short term reference picture is the first occurring short term reference picture in the reference picture list and the zero-th entry in the reference picture list, the variable specifying the absolute delta picture order count for the short term reference picture is equal to the syntax element plus one, and in a case that the short term reference picture is not the first occurring short term reference picture in the reference picture list, the variable specifying the absolute delta picture order count for the short term reference picture is equal to the syntax element.

3. A non-transitory computer-readable medium of a device coupled to at least one processor and storing computer-executable instructions that, when executed by the at least one processor, cause the device to:

generate a bitstream, which is used to reconstruct an image by the device, wherein:

the bitstream comprises a syntax element, abs_delta_poc_st, in a reference picture list structure, the syntax element specifies a value for a variable specifying an absolute delta picture order count for a short term reference picture, in a case that the short term reference picture is a first occurring short term reference picture in a reference picture list and a zero-th entry in the reference picture list is a long-term reference picture entry or an inter-layer reference picture entry, the variable specifying the absolute delta picture order count for the short term reference picture is equal to the syntax element plus one, in a case that the short term reference picture is the first occurring short term reference picture in the reference picture list and the zero-th entry in the reference picture list, the variable specifying the absolute delta picture order count for the short term reference picture is equal to the syntax element plus one, and in a case that the short term reference picture is not the first occurring short term reference picture in the reference picture list, the variable specifying the absolute delta picture order count for the short term reference picture is equal to the syntax element.

* * * * *